United States Patent
Keite-Telgenbüscher et al.

(10) Patent No.: US 8,383,997 B2
(45) Date of Patent: Feb. 26, 2013

(54) HEATED PLANAR ELEMENT AND METHOD FOR ITS ATTACHMENT

(75) Inventors: Klaus Keite-Telgenbüscher, Hamburg (DE); Monika Junghans, Hamburg (DE); Bernd Dietz, Ammersbek (DE); Udo Dominikat, Wees (DE); Frank Domann, Uetersen (DE); Ute Ellringmann, Hamburg (DE)

(73) Assignee: tesa SE, Hamburg (DE)

( * ) Notice: Subject to any disclaimer, the term of this patent is extended or adjusted under 35 U.S.C. 154(b) by 546 days.

(21) Appl. No.: 12/640,703

(22) Filed: Dec. 17, 2009

(65) Prior Publication Data
US 2010/0170889 A1 Jul. 8, 2010

(30) Foreign Application Priority Data
Dec. 19, 2008 (DE) .................. 10 2008 063 849

(51) Int. Cl.
*H05B 3/02* (2006.01)
*B29C 65/52* (2006.01)
(52) U.S. Cl. ................. 219/546; 156/60
(58) Field of Classification Search ........... 219/546; 156/60, 272.2
See application file for complete search history.

(56) References Cited

U.S. PATENT DOCUMENTS

| | | | |
|---|---|---|---|
| 4,775,778 A | 10/1988 | van Konynenburg et al. | |
| 5,864,280 A | 1/1999 | Hall | |
| 2010/0038025 A1* | 2/2010 | Keite-Telgen-Buscher et al. | 156/272.2 |

FOREIGN PATENT DOCUMENTS

| | | | |
|---|---|---|---|
| DE | 29 48 350 A1 | 6/1980 | |
| DE | 103 10 722 A1 | 9/2004 | |
| DE | 10 2007 007617 A1 | 8/2008 | |
| EP | 0 307 205 A1 | 3/1989 | |
| EP | 0 311 142 | 12/1989 | |
| EP | 0 435 923 A1 | 7/1991 | |
| EP | 0 512 703 A1 | 11/1992 | |
| EP | 0 852 801 A1 | 7/1998 | |
| FR | 1 323 543 A | 4/1963 | |

OTHER PUBLICATIONS
EP Search Report dated May 26, 2011.

\* cited by examiner

*Primary Examiner* — Hung Vu
(74) *Attorney, Agent, or Firm* — Norris, McLaughlin & Marcus, P.A.

(57) ABSTRACT

A double-sidedly bondable planar element which has an electrical contacting layer via which it is self-regulatingly intrinsically heatable and at the same time has a high flexibility. The particular features of this planar element are that the planar element in the storage condition is adhesive on one side only, and is therefore particularly easy to handle, and that, on bonding, the adhesive passes through cutouts in the contacting layer, and the planar element thus becomes double-sidedly bondable. The invention further provides a method for the bonding of this planar element, including as a key step the passage of the adhesive through the cutouts in the contacting layer, thus turning a single-sidedly adhesive planar element into a double-sidedly adhesive planar element.

17 Claims, 10 Drawing Sheets a)

b)

a)

b)

HEATED PLANAR ELEMENT AND METHOD FOR ITS ATTACHMENT

Figure 1:
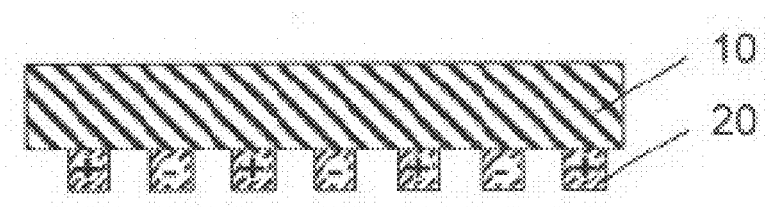
Figure 1:
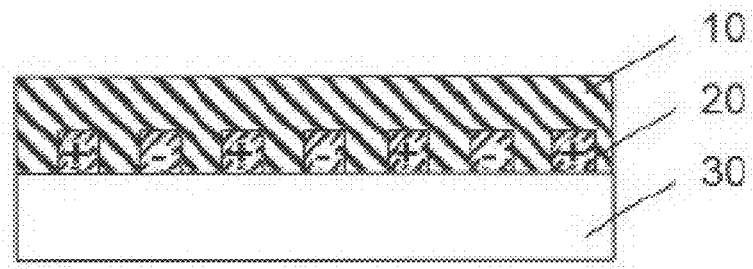

The invention relates to a planar element having an obverse and a reverse and comprising a heating layer and a contacting layer, the heating layer being composed of an intrinsically heatable self-adhesive which is designed as a conductor which heats up when an electric current is passed through, and the contacting layer being designed as an at least substantially two-dimensionally extended contacting element which is perforated by cutouts, and having a first side face and a second side face, the contacting layer via the first side face being in contact with the heating layer and being in electrically conducting communication therewith, and also to the use of this planar element. The invention further relates to a method of joining such a planar element to a bonding substrate.

There are many areas where electrical heating systems are used to heat articles or spaces. In electrical heating systems, heat in the form of thermal energy is obtained by conversion from electrical energy (including magnetic energy). Electrical heating systems may fundamentally be based on different technical principles. Besides the generation of heat on the basis of capacitive or inductive effects or of electromagnetic radiation, heating systems have become established that include resistance heating elements (and are known as resistance heaters). In systems of this kind the thermal energy that comes about when an electrical current is passed through the resistance heating element (Joule heat) is utilized. In principle, as the resistance heating element, it is possible to use any electrical conductor that has a non-zero finite resistance value.

The selection of the resistance heating element is made on the basis of the heat performance to be obtained, which is dependent in turn on the resistance value of the resistance heating element and on the electrical current flowing through the resistance heating element, and therefore, in accordance with Ohm's law, on the applied voltage. Consequently the resistance heating element is selected in accordance with the nature of the conduction pathways it contains, such as in accordance with its cross section, length, specific resistance, and thermal load-bearing capacity.

In the automotive industry in particular the use of resistance heaters is on the increase—for the purpose, for instance, of heating car seats, car windows and external car mirrors. In order to bring about the desired heating in such applications, the simplest systems involve resistance wires that are laid flatly. Other systems, as their resistance heating element, have laminar conductors, examples being those comprising electrically conducting polymer layers. Thus, for instance, there may be laminar resistance heating elements bonded to the reverse of the mirror glass of an external car mirror, connecting the mirror glass to a backing plate in the mount of the external car mirror and being contacted extensively via conductor faces made of aluminium. When a voltage is then applied to the resistance heating element, it heats up as a result of the current flow. The heat that this generates is transmitted via a double-sided pressure-sensitive adhesive tape to the glass surface of the mirror, thereby heating it. In this way it is possible to obtain temperatures of 45° C. to 80° C. on the glass surface of the mirror.

Such a system of backing foil with conductor faces and intrinsically heatable ink is sufficient to obtain heating but necessitates a relatively complicated construction, since the individual components of the heating element must be bonded not only to the glass of the mirror but also to the backing plate of the mirror, which in many cases is composed of the plastic acrylonitrile/butadiene/styrene (ABS). The adhesive bonding of these different materials imposes particular requirements on the adhesive system to be used.

In addition to the considerations originating from the materials of the particular substrate, it is necessary with a pressure-sensitive adhesive tape of this kind, which is used to attach a heating element to a mirror plate and which transports the heat from the heating element to the mirror surface, for there to be not only a very high thermal conductivity but also particular adaptations in respect of the thermal shear strength at elevated temperatures and also the weathering resistance and pressure-sensitive adhesion at low temperatures. This applies likewise to a separate adhesive layer that may be provided for attaching the composite tape, comprising backing foil and conductive ink, to the backing plate of the mirror mounting.

All in all, however, a composite tape of this kind has a low flexibility and consequently is relatively rigid. The composite tape adheres poorly to a curved substrate, since the strength of the composite tape opposes deformation with a high mechanical resistance. As a result of this there may be local or complete detachment of the heating element from the bonding substrate (support), which reduces or even prevents the transmission of the electrically generated thermal energy to the bonding substrate.

Furthermore, it may be the case that, in a composite tape bonded to a bonding substrate having a curved surface, the tape detaches from the substrate when the latter is heated, since, together with the substrate, the adhesive of the composite tape is heated and thus softens. As a result of the high inherent stiffness of conventional composite tapes, this may result in splitting of the softened adhesive, causing it to detach from the bonding substrate. Moreover, the rigidity of the construction of conventional bondable heating elements is detrimental to the mechanical low-temperature impact strength of a bond between different bonding substrates, such as between a mirror and a mirror mount.

In the case of large and curved substrate surfaces in particular, furthermore, a problem which arises is that differing gap dimensions can occur over the surface as a result of manufacturing tolerances (such as of mirror glass and support plate), and often prevent a full-area adhesive bond. These regions may be penetrated by liquid or gaseous media (fluids), such as rainwater or condensation, for example, which may further reduce the strength of the adhesive bond.

This effect is problematic in particular in the case of rearview car mirrors which have a single-piece mirror with an extended range of view, wherein the mirror has a surface curved in two spatial directions (wide-angle mirrors or close-proximity mirrors). In the case of such a curvature in two dimensions, bonding of the mirror to the bondable heating element is prevented by the rigid backing foil on which the conductor face structures are applied. In addition to the backing foil, the conductor faces as well are a hindrance to bonding to a curved substrate, since they are composed of comparatively rigid metal layers, conductive coating materials, liquid inks or printing inks, which may break if stretched or bent significantly, meaning that the electrical contact in these systems is not reliably ensured.

A further problem, arising in the case of modern exterior car mirror constructions, is that, in addition to the bondable heating element, there are further functionalities to be realized in the external car mirror (such as electrochromic dimming of the mirror, for instance), whose realization likewise contributes to the installed depth or overall thickness of the component. As a consequence of such increasingly thick functional and bonding constructions, their increasing thickness a consequence of the functional structures required, between the mirror glass itself and the support plate, the freedom of the designer in the design of the car mirror is significantly restricted and, moreover, the weight of the external car mirror as a whole is increased.

An improvement in this situation has been achieved through joint realization of the electrically conducting structures of the heating element with the adhesive tape in one planar element. A pressure-sensitively adhesive planar element of this kind which is intrinsically heatable and combines the heating function with the pressure-sensitive adhesion is described in DE 103 10 722 A1. As a disadvantage of this construction, however, it has emerged that the adhesive increasingly loses pressure-sensitive adhesion in line with its proportion of electrically conducting constituents by means of which, therefore, the heating of the adhesive is possible to start with. With this construction as well, in addition, there is still the problem of inadequate flexibility of the planar element, consequently lowering considerably the reliability of an adhesive bond. This in turn results in reduced mechanical, electrical and thermal contact via the bond, so decreasing the maximum quantity of heat that can be utilized, and making heat transfer more difficult. For this reason it has been proposed that a planar element be used which has a contacting layer comprising an at least substantially two-dimensionally extended contacting element which is perforated. As a result of the planarly perforated design of the contacting element, the latter requires a flexible nature and hence an increased fracture resistance. At the same time the contacting element gains flexibility parallel to the principal extent (two-dimensional extent, principal plane of extent) of the planar element, and so the contacting element is movably flexible in response to a force acting transverse to the principal extent, without breaking under the resulting mechanical stress. At the same time the at least substantially two-dimensional extent of the contacting element ensures that the cross section of the contact area with the heating layer that conducts the electrical current is sufficiently large to ensure extensive heating and hence to ensure the primary functionality. As a result of this particular design, the planar element of the invention must not have any stabilizing support film, which would lower its flexibility. With a support-free planar element of this kind it is therefore possible to obtain the desired flexibility.

A disadvantageous feature of these planar elements, however, is the poor positionability and lack of repositionability. Hence it is extremely difficult to contact a flexible planar element of this kind with the substrate without already producing a stable bond. The result of this is that precise alignment of the planar element on the substrate prior to bonding is not readily possible (poor positionability). Moreover, the support-free planar element bonded to the substrate can also not be detached again from the substrate without a risk of damaging the filigree structure of the contacting element, and so its position can no longer be subsequently corrected (lack of repositionability).

The latter is a consequence inter alia of the decrease in inherent stability that goes hand in hand with the drastic increase in flexibility. Reduced stability in the case of a heating element is more problematic than in the case of a conventional adhesive tape, since damage to the planar element as a whole automatically also results in damage to the electrically conducting structures of this planar element, and this may lead to its heating power being adversely affected or even to the heating functionality being lost entirely.

Damage to the planar element occurs in particular during the preparation of the planar element for bonding. Thus, for example, during the removal of protective films, there may also be destruction of the planar element. Protective films of this kind typically cover the adhesive areas of the planar element in the course of storage, in order to prevent unintended bonding in the storage condition. The storage condition (storage form) identifies the state of a bondable planar element in which it is stored prior to subsequent bonding, in the form, for example, of individual stacked sheets, a wound-up roll or the like.

Immediately prior to bonding, the protective film is removed from the adhesive area. For this reason, the surface of the protective film is typically adhesion-reducingly treated, in order to facilitate the detachment of the planar element from the protective film. However, even such reduction in adhesion is in practice not sufficient to prevent damage to the planar element reliably, particularly as the support-free planar element is usually to be as thin as possible.

It is an object of the present invention, therefore, to provide a double-sidedly bondable planar element that eliminates these disadvantages and that can be detached without damage from a protective film and is also readily positionable prior to bonding, but also has a simple construction at low thickness, and so can be produced favourably from the standpoints both of economics and of environment. An object in particular was to provide an improved intrinsically heatable and double-sidedly bonding planar element which exhibits reduced adhesion to the protective film without adverse effect as a result on the subsequent bonding strength.

This object is achieved, surprisingly and, to the skilled person, in an unforeseeable way by means of a planar element of the type specified at the outset, in which the second side face of the contacting layer forms the obverse of the planar element and in which, moreover, the cutouts in the contacting element are designed so as to pass through over the thickness of the contacting element and to be substantially adhesive-free at least in the region of the second side face.

As a result of the fact that the second side face of the contacting layer constitutes the obverse of the planar element, assurance is provided that at most only a little self-adhesive is present on the obverse of the planar element in the storage condition. The quantity of adhesive that is located there, moreover, is greatly reduced by the fact, moreover, that the cutouts in the contacting element are in substantially adhesive-free form at this point, in other words, by the fact that, at least in the region of the second side face, which forms the outer obverse of the planar element, the cutouts contain no self-adhesive or at most only a little self-adhesive. The effect of this is that the cutouts on the obverse of the planar element are virtually adhesive-free, and so the quantity of self-adhesive located on the obverse of the planar element is reduced. With this it is possible to bring the planar element into contact with the substrate and align it exactly before bonding is obtained. Moreover, any sticking to the protective film is reduced, as a result of which it is possible to remove the protective film from the planar element prior to bonding, without adversely affecting the functionality of the planar element.

The design of the cutouts as continuous openings, moreover, provides assurance that, for double-sided bonding of the planar element, the self-adhesive is able to flow from the first side face of the contacting layer through the cutouts in the contacting element and on to the second side face, where it can contact the substrate, with the consequence of a high bond strength being ensured even on the obverse of the planar element, which in the storage condition is virtually adhesive-free, as a result of the self-adhesive that has passed through.

The general principle of the double-sidedly bondable planar element having a non-adhesive layer, consisting of a sheetlike structure provided with adhesive-free cutouts and having a layer of self-adhesive only on one of its two side faces is also, taken per se, an invention. (A layer of adhesive is any layer which comprises an adhesive and is adapted for the adhesive joining of a planar element to a substrate.) In relation to this superordinate invention (namely a planar element having an obverse and a reverse, comprising in each case a layer of self-adhesive and a functional layer, the functional layer being at least substantially two-dimensionally extended and of a design perforated by cutouts, and having a first side face and a second side face, the functional layer being in contact with the layer of self-adhesive via the first side face, the second side face of the functional layer forming the obverse of the planar element, and the cutouts in the functional layer being designed to pass through over the thickness of the functional layer, and being present in adhesive-free form at least in the region of the second side face), the planar element described above forms in its turn a particular embodiment, in which the contacting element is provided as the non-adhesive layer. The further features of the particular embodiments in relation to the heated planar element of the invention, and also its general and specific examples, therefore describe developments of the superordinate invention, it being possible for them to actualize the superordinate inventive concept both in combination with the specific features of the planar element of the invention (i.e. in a heated planar element) and also without these specific features (i.e. in a general, non-heated planar element). By way of example, in accordance with the superordinate concept, a double-sidedly bondable planar element may also be realized with a non-adhesive functional layer (a support, for example) composed of a sheetlike structure provided with adhesive-free cutouts. The sheetlike structure in that case may have a layer of self-adhesive on only one of its two side faces, with the sheetlike structure being at least partly embedded in the said layer.

For the actualization of the invention it is particularly favourable if the intrinsically heatable self-adhesive is a posistor. A posistor (PTC element) is a resistance heating element whose current-conducting regions are composed of a material which with regard to its electrical resistance has a positive temperature coefficient (PTC). Posistors, accordingly, are materials which conduct electrical current and whose resistance increases with temperature, and they therefore conduct current more effectively at lower temperatures than at high temperatures. The use of materials of this kind with posistor behaviour as resistance heating elements (PTC elements) affords the advantage that, when a constant voltage is applied to such a heating element, the overheating of the heating element is prevented, since, in the case of increasing the operating temperature, there is an increase in the resistance of the heating element, as a result of which, in accordance with Ohm's law, the current reduces in proportion to the increase in resistance, the overall heat output decreases, and the heating element cools down again. Depending on the specific application, an intrinsic regulating system of this kind may be used to limit temperature instead of or in addition to an external regulating system.

Furthermore, it is useful if, in addition to the features of one or more of the aforementioned designs, the self-adhesive comprises at least one electrically conductive filler. In this way it is possible, in a particularly simple and cost-effective way, to obtain an electrically conducting adhesive which offers a heating power which is high enough for a lot of applications. It is particularly advantageous here if the electrically conducting filler is selected from the group encompassing graphite, carbon nanoparticles and carbon black, more particularly conductive carbon black. The advantage of such a composition lies in the fact that these fillers enter into a particularly good bond with the polymer matrix, with the consequence that, overall, an adhesive of this kind possesses high cohesion and therefore has high mechanical load-bearing capacity. It is particularly surprising in this context that the flow behaviour of a self-adhesive which comprises such particles and is therefore of high viscosity is still sufficient overall for this self-adhesive to be able to pass through the cutouts in the contacting element and travel the required flow path.

It is of advantage, furthermore, if the first side face of the contacting layer is embedded at least partly in the intrinsically heatable self-adhesive. This ensures that the contacting layer on the planar element is fixed not only when in the bonded condition (which differs from the storage condition primarily in that the self-adhesive passes through the cutouts and on to the obverse of the planar element, and thus surrounds the contacting element) but instead in the storage condition itself, thereby more effectively preventing unintended detachment of the contacting element. With this design as well, however, it should be ensured that the cutouts are in at least substantially adhesive-free form at least in the region of the second side face.

Instead, however, the first side face of the contacting layer may also bear at least substantially flatly against a side face of the intrinsically heatable self-adhesive. This embodiment is of advantage especially in the case of low-viscosity or medium-viscosity self-adhesives, since in this way the distance between the self-adhesive and the obverse of the planar element can be selected to be as large as possible. This reduces the danger of the self-adhesive flowing towards the obverse in the course of storage or even beforehand.

It is of advantage in this case if the thickness of the contacting element is not more than 50 µm or even is not more than 20 µm. With such a thickness, assurance is provided that the self-adhesive is able, when the planar element is bonded, to flow through the contacting layer and to fill completely the cutouts in the contacting element, in order thus to provide a maximum of bonding strength.

Furthermore, it has emerged as being favourable if the cutouts make up at least 25% of the area of the first side face of the contacting layer, preferably more than 50% of the area of the first side face of the contacting layer or even more than 75% of the first side face of the contacting layer. In this way the area of passage for the self-adhesive is sufficiently large to allow a high-strength bond. For applications in which particularly high strength is unnecessary, the cutouts may also occupy a smaller area; for example, in the case of connections with only a weak mechanical loading, the cutouts may account for only 10% of the area of the first side face of the contacting layer.

In accordance with one particular embodiment, the perforated contacting element may have bridge-like regions. This increases the flexibility of the contacting layer and hence also that of the planar element overall in the principal plane of extent (more particularly, transverse with respect to the orientation of the bridge-like regions), with at the same time a high stability being ensured, particularly parallel or obliquely to the orientation of the bridge-like regions. Since the bridge-like disposition of the contacting layer may result in the cutouts likewise having an elongated form, moreover, the resistance presented by the contacting element to the self-adhesive on passage through the cutouts can be reduced, and hence the passage of the self-adhesive in the course of bonding can be facilitated.

An additional improvement in the passage of the self-adhesive during bonding is obtained if the bridge-like regions have a width of not more than 5 mm or even of less than 1 mm. This further enhances the strength of the bond.

It may further be of advantage for the bridge-like regions of the perforated contacting element to be present in a branched comb structure or finger structure. A form of this kind allows optimum utilization of virtually the entire area of the planar element for heat generation with only small cutouts, without significantly adversely affecting the mechanical properties or raising the likelihood of a sharp drop in voltage over the layer. In the case of a comb structure and in the case of a finger structure (interdigital structure), individual teeth or fingers branch off from a main strand. The main strand in this case may have a larger cross section than the teeth or fingers, or else may have the same cross section. The difference between a comb structure and a finger structure is that in the case of a comb structure, the elements that branch off are disposed on the same side of the main strand, whereas, in the case of a finger structure, they branch off from different sides. Both structures may have either single or multiple branches and both regular and irregular arrangements, and can be employed when the contacting element is designed as a single electrode and also when the contacting element is designed as a plurality of electrodes within the contacting layer.

The present invention provides, finally, a method for joining a planar element of this kind to at least one bonding substrate, in which the planar element is first contacted with the bonding substrate in such a way that the second side face of the contacting layer touches a region of the surface of the bonding substrate and so forms a loose preassembly, then the intrinsically heatable self-adhesive passes through the cutouts in the contacting element and at least partly fills them, and finally the obverse of the planar element is bonded to the bonding substrate via the intrinsically heatable self-adhesive that is passed through the cutouts.

A bonding method of this kind is specifically tailored to the planar element of the invention, and utilizes its construction in a particular way, in that the self-adhesive passes to the obverse of the planar element only in the course of the second step, and this side of the planar element, therefore, becomes adhesive only at the time of bonding. The deployment of this method allows a particularly simple bonding regime and ensures, moreover, that the planar element, which is only single-sidedly adhesive in the storage form, can be bonded double-sidedly without application of a further adhesive.

In the course of the method of the invention, the self-adhesive passes under the action of force through the cutouts in the contacting element and so reaches the obverse of the planar element. In principle, any suitable forces may bring about the passage of the self-adhesive, such as the flow-through of a viscous self-adhesive as a result of gravity, as a result of interfacial forces or as a result of capillary forces. It is particularly advantageous, however, if the process is accelerated by pressing together the preassembly composed of planar element and bonding substrate for the purpose of the passage of the intrinsically heatable self-adhesive through the cutouts in the contacting element, so that a force is added which acts in the form of an external pressure. Instead of this or in addition to it, passage may be improved by temporarily lowering the viscosity of the self-adhesive; this can be achieved in a particularly simple way if, for the purpose of passage of the intrinsically heatable self-adhesive through the cutouts in the contacting element, the preassembly composed of planar element and bonding substrate is heated.

Unless indicated otherwise, the individual advantageous embodiments can be combined with one another as desired and can be used to obtain the advantageous effects described above and also others. These features are therefore also considered protectable per se in combination with the features of the independent claims.

Given below, for the purpose of illustrating the invention, is a general description of the invention, including a description of certain representative examples of individual constituents of part-aspects of the invention, which may be linked with one another almost arbitrarily as a function of the particular properties desired.

In principle the invention provides a planar element having an obverse and a reverse. A planar element for the purpose of this specification includes in particular all customary and suitable structures having a substantially two-dimensional extent. They enable planar bonding and may be of various embodiments, more particularly flexible, in the form of an adhesive sheet, adhesive tape, adhesive label or shaped diecut. The terms obverse and reverse refer to the two surfaces of the planar element parallel to its principal extent, and serve merely to distinguish these two faces arranged on opposite sides of the planar element, without the choice of the terms laying down the absolute spatial arrangement of the two faces; accordingly, the obverse may also represent the side face of the planar element that in spatial terms is positioned at the rear, specifically if, correspondingly, the reverse forms its side face which in spatial terms is positioned at the front.

In accordance with the invention the planar element comprises two different layers, a heating layer and a contacting layer. A layer more particularly is a two-dimensional disposition of a system of uniform functionality whose dimensions in one spatial direction are significantly smaller than in the two other spatial directions, which define the principal extent. A layer of this kind may be of compact or else perforated design and may be composed of one material or of different materials, particularly when these materials contribute to the uniform functionality of the said layer. A layer may have a constant thickness over its entire superficial extent, or else different thicknesses. Furthermore, of course, a layer may also have more than one single functionality.

A heating layer is any layer which is set up for the heating of the planar element. A contacting layer is any layer which is a good conductor of electrical current and with the aid of which a voltage can be applied to the heating layer and/or a current can be passed through at least a sub-region of the heating layer; the contacting layer therefore serves for the connection of external electrical supply lines to the planar element (contacting electrode function).

The contacting layer is designed as an at least substantially two-dimensionally extended contacting element perforated by cutouts. A contacting element is more particularly an element comprising a material that conducts electrical current and whose structure electrically conducts the current continually at least in a sub-region. "At least substantially two-dimensionally extended" means that the sub-regions of which the contacting layer is composed are present within the layer in an areal disposition, it also being possible for individual sub-regions to project out of this areal disposition. The contacting layer may be in one-part or multi-part form.

The contacting layer is an electrically conducting connection between the heating layer and the current source or voltage source. In this arrangement the contacting layer may be formed either as one of the two electrode connections (poles) of the heating layer or else may form both electrode connections. Where the contacting layer constitutes only one of the two electrode connections of the heating layer, a second electrode connection is necessary to allow a current to flow through the heating layer and for the heating layer to warm up.

This second electrode connection may be formed within the planar element of the invention—in the form of an additional second flexible contacting layer, for instance—or else may be provided on one of the two bonding substrates, for example as a metallic layer on the surface of a glass (for instance, as the silver layer of a mirror).

The contacting layer has a first side face and a second side face. The first side face of the contacting layer and the second side face of the contacting layer are the two side faces of the contacting layer which are disposed parallel to its principal extent.

The contacting layer is not closed over its full area, but instead is perforated, and so this layer is discontinuous and has cutouts (depressions) which also extend in a direction perpendicular to the principal extent of the layer.

It is essential to the invention here that the layer itself is not compact over the full area, but that, instead, the cutouts in the contacting element are designed to pass through continuously over the thickness of the contacting element, in other words to extend through the layer (continuous holes). In addition to these continuous cutouts, the contacting layer may optionally also have other cutouts which are not continuous but instead are limited only to parts of the layer thickness (hollows, for instance for better anchoring or for locally reducing the thickness of the contacting layer).

The cutouts may be of any shape, for instance regular or irregular, of uniform or varying width, and may have upright, oblique or curviform wall sections and the like. The cutouts may run in different directions in the contacting layer or else may have one particular preferential direction, and so the contacting layer has a principal extent which runs at least substantially in one spatial direction. In the last-mentioned way it is possible to obtain particularly high flexibility in the contacting layer and hence also in the planar element in one direction, in conjunction with minimal adverse effect on the mechanical stability and on the electrical contact cross section. This may be particularly sensible when, for instance, the planar element is to be attached to a cylindrical surface which is highly curved in one direction and has a small radius of curvature.

As a further feature relevant to the invention, the cutouts, at least in the region of the second side face, are substantially adhesive-free. This includes those cutouts which are adhesive-free over their entire extent, and hence completely, and also those cutouts which have no adhesive only in a small sub-region in the immediate vicinity of the second side face. A cutout which is substantially adhesive-free in the region of the second side face is a cutout which in the region of the second side face and hence at the obverse of the planar element comprises at most a small amount of self-adhesive, and preferably indeed no self-adhesive at all. Where the cutout comprises a small amount of self-adhesive, the amount must in any case be so small that this self-adhesive has the consequence of at most a very weak bonding action to the observe of the planar element, and must preferably not protrude from the cutout there. Qualifying as a completely adhesive-free cutout, then, would be not only an unfilled cutout but also a cutout filled wholly or partly with a non-adhesive substance, i.e. with a substance which has neither any significant pressure-sensitive adhesion nor any significant hotmelt adhesion.

The cutouts may make up any desired proportion of the superficial extent of the contacting layer; on practical grounds, in particular, an areal fraction of at least 25% of the area of the first side face of the contacting layer has emerged as being favourable, preferably more than 50% of the area of the first side face of the contacting layer or even more than 75% of the first side face of the contacting layer.

With a view of the specific embodiment of the depressions, the perforated contacting element may take different forms, for instance as an interrupted area, as a folded or branched wire structure or the like. This also includes a structure in which the contacting element has bridge-like regions. Any sub-region of the contacting element is considered to be bridge-like if its dimension in one direction (the length of the respective bridge-like region) is considerably greater than in the other two directions, and, in contradistinction to a wire-shaped structure, moreover, its dimension in a second direction (the width of the respective bridge-like region) is greater than its dimension in the third direction (the thickness of the respective bridge-like region).

The dimensions of the bridge-like regions may in principle be selected arbitrarily; for their width, a width of not more than 5 mm or even of less than 1 mm has emerged as being favourable.

The edge areas of a bridge-like region of this kind may be regularly or irregularly shaped. Thus, for example, a bridge-like region may be formed by a flat rectangular section, a circular section, a circular ring section or else have a completely irregular shape.

The bridge-like form of the sub-regions of the contact element may likewise produce a bridge-like form of the cutouts, but for these it is also possible for other embodiments to be suitable. Moreover, the bridge-like regions of the contact element may be present in a superordinate structure, for example in a singly or multiply branched comb structure or finger structure.

Further suitable contacting elements are, for example, perforated metal foils, expanded metal grids, wire grids, metal meshes or electrically conducting nonwovens. Non-metallic conductors as well such as metal oxides (for example indium tin oxide) or intrinsically conductive polymers can be used in accordance with the invention, provided that they are appropriately structured. To improve the flexibility of the planar element, the contacting layer preferably has an average or even maximum thickness of less than 50 μm, preferably of less than 20 μm or even of less than 10 μm.

The regions of the contacting element that conduct the electrical current may be of any desired design, for example in conducting connection with one another (all regions or only some of the regions) or may each be present as an individual region of the contacting element which is not in conducting connection with the other regions via the contacting element. Where appropriate it is also possible for some of the regions to be in electrically conducting connection with one another and for other of the regions to be present each individually. This does not of course rule out an electrically conducting connection via the heating layer.

If the perforated contacting element has two or more sub-regions which are not in electrically conducting connection with one another via the perforated contacting element, then it is possible to realise both electrical contacts (electrodes or poles), which are needed for the heating effect of the heating layer, within the contacting element, in order to be able to do without other current-conducting layers outside the planar element, and to facilitate the final assembly of the planar element to the bonding substrates.

Provision may also be made in particular, however, for the contacting element to comprise two regions which are not in conducting connection with one another and which are designed as the two electrode leads (poles) of the heating layer.

Where the whole contacting element is universally conducting, it is used as one of the two poles of the heating layer, in which case a flow of current then occurs through the heating layer principally in a direction perpendicular to the principal extent, whereas, in the case of an arrangement in which the contacting element represents both electrode connections, a lateral flow of current within the principal extent occurs in addition to or instead of the perpendicular flow of current.

Furthermore, it is also possible to apply different voltages to each of the individual sub-sections of the planar element, in order, for instance, to generate a voltage gradient in the area of the planar element and to adapt the heating output individually to the particular requirements.

Within the planar element of the invention, the contacting layer is disposed on one side on the heating layer, the contacting layer via the first side face being in contact with the heating layer and being electrically conductingly connected therewith. The other side face of the contacting layer, the second side face, in this arrangement forms the obverse of the planar element. As a result of this particular arrangement, the obverse of the planar element is designed so that it is not adhesive or at most is only slightly adhesive, thus preventing severe sticking of the planar element to a protective sheet which covers its obverse in the storage condition.

The direct contact between the first side face and the heating layer may take any desired form. Thus, for instance, the first side face of the contacting layer may bear at least substantially flatly to one side face of the intrinsically heatable self-adhesive, such that the contacting layer is not embedded in the self-adhesive in any sub-region, but instead merely abuts the adhesive. At least substantially means that, between the contacting layer and the self-adhesive, the contact area is of generally two-dimensional form, which does not rule out the possibility of the contact area locally, in sub-regions, also having a height profile, provided that the form overall is even.

Instead, the first side face of the contacting layer may also be at least partly embedded in the intrinsically heatable self-adhesive. Embedding is understood to be the arrangement of sub-regions of the contacting layer within the outer bordering plane of the layer of self-adhesive, these sub-regions of the contacting layer touching the self-adhesive locally on two or more sides. This likewise encompasses the first side face of the contacting layer being embedded in the intrinsically heatable self-adhesive only in a sub-region of the contact area, and merely bearing against the adhesive in the remaining regions of the contact area.

Accordingly, the heating layer is in contact with a first side face of the contacting layer, and hence these two layers touch one another directly, i.e. without mediation. Moreover, the heating layer is in electrically conducting connection to the first side face of the contacting layer. A connection is termed electrically conducting in particular when the overall electrical resistance of the connection, which is contributed to by the resistances of the partial sections to be connected, plus the contact resistance of the connection, is at most of the same order of magnitude as the overall resistances of the remaining conducting regions and contacts. The second side face of the contacting layer forms one of the two outer sides of the planar element, namely its obverse.

The heating layer is composed of an intrinsically heatable self-adhesive which is designed as a conductor which heats up when an electrical current is passed through. Self-adhesives in the present case include without exception all adhesives based on pressure-sensitive adhesives and/or hotmelt adhesives, in other words adhesives which themselves allow permanent bonding to the substrate. "Based on" or "on the basis of" denotes in the present case that the technical properties of this adhesive system are dependent at least to a large extent on the fundamental properties of this adhesive or these adhesive constituents (referred to as the base polymer), without, of course, ruling out the additional influencing of these properties through use of modifying auxiliaries or additives or of further polymeric adhesives in the adhesive system.

Pressure-sensitive adhesives (PSAs) are adhesives which allow permanent bonding to the substrate at room temperature even under a relatively weak applied pressure. In contrast, hotmelt adhesives are adhesives which enter into a permanent bond with the substrate only at elevated temperatures, the resulting bond being maintained even on subsequent cooling of the bond to room temperature. The bondability of both PSAs and hotmelts derives from their adhesional properties.

Adhesion typically refers to the physical effect brought about by the holding-together of two phases, brought into contact with one another, at their interface on account of intermolecular interactions that occur there. Adhesion therefore defines the attachment of the adhesive to the substrate surface and can be determined as tack and as bond strength. In order to influence the adhesion of an adhesive in a specific way, it is common to add plasticizers and/or bond strength-increasing resins (referred to as tackifiers) to the adhesive.

Cohesion typically refers to the physical effect which results in the internal holding-together of a substance or composition on account of intermolecular and/or intramolecular interactions. The forces of cohesion therefore determine the consistency and fluidity of the adhesive, which can be determined, for instance, as viscosity and as holding power. In order to increase the cohesion of an adhesive in a specific way, it is often subjected to additional crosslinking, for which reactive (and hence crosslinkable) constituents or other chemical crosslinkers are added to the adhesive and/or the adhesive is subjected to actinic (high-energy) radiation in an aftertreatment.

The technical properties of a pressure-sensitive adhesive are determined primarily by the relationship between adhesional and cohesional properties. For certain applications, for example, it is therefore important that the adhesives used are highly cohesive, i.e. possess a particularly strong internal holding-together, whereas for other applications a particularly high adhesion is required.

The use of pressure-sensitive adhesives allows particularly simple bonding, without the need for other operating steps such as heating of the planar elements, for instance, with the consequence that self-adhesives of this kind can be used even in the case of the substrate which has a highly irregular geometry or is heat-sensitive. When hotmelt adhesives are used, a particularly high bond strength is achievable, which is why these systems are employed in particular where the bond is exposed to strong mechanical loads.

In addition, the self-adhesive of the heating layer is of intrinsically heatable design. An intrinsically heatable layer is any layer which per se is electrically heatable—in other words, this layer is capable, without further components or parts in the layer, of producing heat itself when an electrical current is passed through the layer or when an electrical voltage is applied to the layer, it being immaterial whether the current or voltage is an alternating current or voltage or else a direct current or voltage.

As the heating layer it is possible in principle to use all self-adhesives which conduct an electrical current flowing through this self-adhesive, and do so substantially without decomposition. The heat within the heating layer is preferably generated from the drop in voltage in this layer itself that occurs as a result of the electrical resistance, although heating may also be achieved on the basis of other effects, by means, for instance, of another electrothermal transducer or of an electrically initiated exothermic chemical reaction. In accordance with the invention such planar elements may be designed for single or multiple use; likewise, the heat generation process may be able to be carried out once or multiply.

A heating layer of this kind may, perpendicular to the principal extent, have an (average) thickness of less than 1 mm, preferably a thickness from a range from 10 µm to 400 µm, more preferably from a range from 20 µm to 200 µm. Designing the heating layer in this way ensures optimum properties, since on the one hand the heating layer is thick enough to provide a sufficiently high heating power while on the other hand being thin enough to ensure rapid conduction of heat within the heating layer and also good mechanical properties in respect of flexibility and cohesion. For the preferred case of a layer which is used as a resistance heater, it may have an electrical resistance which on the one hand is high enough to allow heating of the layer but on the other hand is low enough to establish a flow of current through the layer to start with.

This heating layer may also have posistor properties, i.e. have a positive temperature coefficient with regard to its electrical resistance and hence exhibit a PTC effect. In terms of its positive temperature coefficient and actual resistance, the layer is preferably designed in such a way that the generation of heat within the heating layer as a result of the PTC effect is limited for the particular operating voltage and the particular operating current, so that the layer is self-regulating with regard to the development of heat, and more particularly does not exceed a defined maximum temperature level. This allows overheating of the planar element to be prevented.

As the self-adhesive it is preferred to use a PSA or hotmelt adhesive which comprises at least one electrically conductive filler as electrically conductive material. An electrically conductive filler is an admixture to a self-adhesive that conducts electrical current either on its own (i.e. without self-adhesive) or else only in the form of the mixture with the self-adhesive.

As a filler it is possible in principle to use all suitable fillers which are compatible with the self-adhesive in question. Use is made more particularly for this purpose of fillers selected from the group encompassing graphite and carbon black, more particularly conductive carbon black (for example Printex® XE from Degussa), and also any desired combinations thereof. In addition or instead it is also possible with preference to use other carbon-based fillers, more particularly those which are nanoscale, i.e. have an extent in at least one spatial dimension of not more than 500 nm, preferably of less than 200 nm or even of less than 50 nm, examples being carbon nanoparticles such as carbon nanotubes (for example Carbon Nanotubes from Ahwahnee or Carbon Nanotube Masterbatches from Hyperion Catalysis), carbon nanofibres, fullerenes and the like.

Advantageously the filler is used in an amount such that the fraction of the filler in the self-adhesive is large enough to ensure sufficient conductivity on the part of the self-adhesive but on the other hand low enough to have only little adverse effect on the mechanical properties of the self-adhesive. Furthermore, a combination of different kinds of fillers may also be advantageous, allowing sufficient electrical conduction properties—posistor properties for example—to be achieved in tandem with a very low degree of filler, particularly in the case of the combination of carbon nanotubes with carbon black or graphite.

The fillers may additionally be used in surface-modified form. This allows specific influence to be exerted over particular properties of the self-adhesive, in order, for instance, to improve the dispersibility of carbon nanotubes or carbon black in the self-adhesive. To increase the PTC effect, the surface of the conductive fillers, such as of the carbon black particles, for instance, may be covered partly or completely with metals such as nickel, silver or gold, with silanes or with formamides.

Factors governing the conductivity and hence also the attainable temperature and heating rate include the degree of filling of the conductive filler, in other words its mass fraction within the self-adhesive. By raising the degree of filling it is possible to achieve higher conductivities and possibly also higher temperatures. Hence the extent of the effect of the electrical heatability of the self-adhesive may be determined by the degree of filling. The degree of filling is advantageously between 1% and 60% by weight. Great preference is given to using between 5% and 30% by weight of filler.

In this way it is possible to realize self-adhesives which first have a sufficiently high conductivity (to allow a current to flow through the self-adhesive to start with) and at the same time has a sufficiently low conductivity (so that there is a pronounced evolution of heat, owing to the drop in voltage at the resistor), so that these adhesives are suitable overall as conducting heating compositions, but which secondly possess a high adhesive fraction, to ensure bonding strength. The electrical conductivity and hence the heatability of the self-adhesive are also dependent on its base polymer, moreover.

In order to obtain the conductive self-adhesive, the electrically conductive fillers may be admixed to the monomers of the self-adhesive prior to the polymerization and/or during the polymerization, and/or may be combined with the polymers only after the end of the polymerization. Preferably the conductive filler is added after the polymerization to a melt of a base polymer of the self-adhesive.

Particularly when the self-adhesive is applied from the melt as a hotmelt system to the planar element of the invention, the electrically conductive filler is preferably introduced directly into the melt. In this case its homogeneous incorporation is desirable in the sense of the invention. Homogeneous distributions of the filler in the self-adhesive are achieved preferably by compounding in twin-screw extruders, continuous compounders (Buss kneaders, for example) or planetary roller extruders. One advantage of this operation is the only brief contamination of the production operation with the separate filler, and also the avoidance of solvents.

Where the self-adhesive is also to have posistor properties, it is possible in principle to use all polymers having suitable adhesive properties and exhibiting a PTC effect—that is, having posistor behaviour. The occurrence and the extent of a PTC effect are dependent on the formation of a network—for example on whether the conductive filler itself is in agglomerated form or not. The PTC effect here may be assisted by factors, among others, including orientations within the polymeric constituents of the self-adhesive that are introduced in the course of the production operation, by the introduction, for instance, of an anisotropy with respect to physical properties and/or with respect to the orientation of the macromolecules.

The posistors used in this kind of adhesively bondable heating element are generally partially crystalline thermoplastics, such as polyethylene, polyvinylidene fluoride, hexafluoropropylene or tetrafluoroethylene, for instance, that contain carbon black. The state of the art is described in detail in DE 29 48 350 A1, EP 0 307 205 A1, EP 0 512 703 A1 and EP 0 852 801 A1, the technical teaching of which is expressly incorporated here. In a mirror heating utility, posistors of this kind can be applied in the form of an ink to a continuous conductor face which serves as an electrical contacting electrode, disposed on a separate backing foil with a thickness of typically 75 µm to 250 µm. The solvent contained in the ink is removed in a subsequent step of drying. Such inks are described comprehensively in EP 0 435 923 A1.

When a self-adhesive with posistor properties with an electrically conductive filler is used, it has proved to be advantageous to use multi-phase systems, more particularly those in which at least one phase undergoes a volume expansion within the temperature range in which the PTC effect occurs, this volume expansion taking place as a result of the heating and being at least partly responsible, according to currently generally recognized scientific explanation, for the posistor behaviour (see J. Meyer in Polymer Engineering and Science, 13 (1973), pp. 462-468). Multi-phase systems in the sense of the invention are interpreted as including self-adhesives based on polymers or polymer blends which have one or more further fillers in addition to the conductive filler.

Having emerged as being particularly advantageous in this context is the use of those self-adhesives which have partially crystalline polymers. Partially crystalline polymer systems used may be both single-phase and multi-phase systems, not only homopolymers but also copolymers, especially partially crystalline block copolymers. The partially crystalline polymers may be part of the base polymer itself or else may represent an adjuvant. The crystalline sub-regions of such partially crystalline polymers have a greater thermal expansion when the polymer matrix undergoes softening than do its amorphous regions.

The hotmelt and/or PSA in the heating layer preferably comprises at least 30% by weight of partially crystalline polymers; even better is a fraction of at least 50% by weight of partially crystalline polymers in the self-adhesive. It has been found that in hotmelt adhesives specifically there is a surprisingly sharp increase in the suitability for obtaining the PTC effect as the fraction of partially crystalline polymers goes up. PSAs, in contrast, lose their pressure-sensitive adhesive properties as the partially crystalline fraction goes up, and so, when using PSAs, the fraction of partially crystalline polymers should be kept lower than in the case of hotmelts, in order still to ensure a sufficiently high pressure-sensitive adhesiveness.

Hotmelt adhesives, consequently, are highly suitable beyond expectations for the exploitation of the PTC effect. Having emerged as being particularly advantageous in the sense of the invention in this context as self-adhesives are hotmelt adhesives comprising partially crystalline polymers which are present at 100% by weight in the base polymer of the adhesive or which are present at least at nearly 100% by weight in the adhesive.

In a hotmelt adhesive and/or pressure-sensitive adhesive as self-adhesive, particularly advantageous partially crystalline polymers are those in which the degree of crystallinity is more than 20% or even more than 40%. The degree of crystallinity can be determined with the aid of dynamic differential calorimetry (Differential Scanning Calorimetry; DSC).

Thus as the self-adhesive it is possible, in the range of partially crystalline thermoplastics, to use polyolefins (low density polyethylene, for example) or copolymers of polyolefins (ethylene-vinyl acetate (EVA), ethylene-acrylic acid (EAA), ethylene-methacrylic acid (EMAA), ethylene-ethyl acrylate or ethylene-butyl acrylate, for example), ionomers, polyamides and/or their copolymers. As well as a sufficiently pronounced PTC effect, these substances also have particularly advantageous hotmelt adhesive properties, and so can be used as a base polymer for a self-adhesive based on a hotmelt adhesive.

Additionally preferred in the range of partially crystalline thermoplastics are acid-modified (with maleic acid or maleic anhydride, for example) polyolefins or their copolymers, since their compatibility with the conductive fillers such as, for instance, carbon black or carbon nanotubes is especially good and since when these polymers are used it is particularly easy to prepare homogeneous dispersions of the filler in the polymer matrix.

Very particularly preferred block copolymers used are styrene block copolymers such as, for instance, SBS (styrene-butadiene-styrene block copolymers), SIS (styrene-isoprene-styrene block copolymers), SEBS (styrene-ethylene-butylene-styrene-block copolymers) or SEPS (styrene-ethylene-propylene-styrene block copolymers).

Also advantageous is the addition of polymeric or inorganic fillers which support the PTC effect by melting in the course of heating. These may be, for example, highly crystalline polyolefin waxes or ionic liquids (low-melting metal salts). The choice of the melting point of the fillers also allows the temperature at which a posistor behaviour (PTC effect) occurs to be adjusted.

In the text below, purely by way of example, further, typical examples are given of self-adhesives which can be employed in principle in accordance with the invention, without this enumeration imposing any restriction.

Hence suitability as self-adhesive of the heating layer is possessed, first, in principle by all customary and suitable pressure-sensitive adhesives (PSAs). Suitable PSAs include in principle all PSA systems having suitable pressure-sensitive adhesive properties, in other words pressure-sensitively adhesive systems. The monomers that serve for preparing the PSAs are selected more particularly in such a way that the resulting polymers can be used as PSAs at room temperature or higher temperatures.

An adhesive is pressure-sensitively adhesive in the sense of the present invention if it possesses pressure-sensitive adhesive properties in accordance with the "Handbook of Pressure Sensitive Adhesive Technology" by Donatas Satas (van Nostrand, New York 1989).

In order to achieve a polymer glass transition temperature, $T_g$, of $T_g \leq 25°$ C., which is preferred for PSAs, the monomers are typically selected such, and the quantitative composition of the monomer mixture selected such, that they behave in such a way, in analogy to the equation presented by Fox (cf. T. G. Fox, Bull. Am. Phys. Soc. 1 (1956) 123), that the desired value for the glass transition temperature $T_g$ of the resulting polymer is given by $$\frac{1}{T_g} = \sum_n \frac{w_n}{T_{g,n}} \qquad (E1)$$

In this equation, n represents the serial number of the monomers used, $w_n$ the mass fraction of the respective monomer n (% by weight) and $T_{g,n}$ the respective glass transition temperature of the homopolymer of the respective monomer n, in K.

Examples of PSAs suitable for the self-adhesive are therefore PSAs based on acrylates and/or methacrylates, silicones, natural rubbers and/or synthetic rubbers. PSAs of this kind offer the advantage that the adhesive properties of the planar element can be controlled within a broad scope and can therefore be custom-tailored to the specific circumstances of the bond to be produced, in respect, for instance, of the particular substrate or the ambient conditions.

Therefore it is possible to use PSAs based on acrylic acid and/or methacrylic acid and/or based on esters of the aforementioned compounds, or those based on hydrogenated natural or synthetic rubbers, on account of their particular ageing stability and hence their capacity to withstand repeated heating operations of the planar element of the invention over a long time.

Suitable more particularly are acrylate PSAs which are obtainable, for instance, by free-radical addition polymerization and which are based at least partly on at least one acrylic monomer of the general formula $CH_2\!=\!C(R^1)(COOR^2)$, where $R^1$ is H or a $CH_3$ radical and $R^2$ is H or is selected from the group consisting of saturated, unbranched and branched, substituted and unsubstituted $C_1$ to $C_{30}$ alkyl radicals. The at least one acrylic monomer ought to have a mass fraction of at least 50% by weight in the PSA.

According to one particularly advantageous embodiment it is possible further to use polymers which (a1) are based at least partly on at least one acrylic monomer of the general formula $CH_2\!=\!C(R^1)(COOR^{2\prime})$, where $R^1$ is H or a $CH_3$ radical and $R^{2\prime}$ is selected from the group consisting of saturated, unbranched and branched, substituted and unsubstituted $C_2$ to $C_{20}$ alkyl radicals, and (a2) are based at least partly on a comonomer which is polymerizable with the at least one acrylic monomer and may be selected in particular from vinyl compounds having functional groups, maleic anhydride, styrene, styrene compounds, vinyl acetate, acrylamides, and photoinitiators functionalized with double bond.

Preferably the at least one acrylic monomer (a1) here has a mass fraction of 65% to 100% by weight and the at least one comonomer (a2) has a mass fraction of 0% to 35% by weight in the self-adhesive.

Furthermore, an average molecular mass $M_w$ (weight average) of the self-adhesive of not more than 800 000 g/mol has proved to be advantageous, particularly with regard to the desired mechanical properties of the PSA.

According to a further embodiment the self-adhesive may also comprise or be based on natural or synthetic rubber compositions. For self-adhesives comprising natural rubber, the natural rubber is degraded to a freely selectable molecular weight and during this or thereafter additized with the electrically conductive filler.

As one particular PSA embodiment for this purpose it is also possible for partially crystalline polymers such as EVA (ethylene-vinyl acetate) or polyolefins and their copolymers, especially block copolymers, to be used as the self-adhesive or to be added thereto. More particularly in the case of use as a PSA, these adhesive systems offer an additional assistance to the PTC effect, owing to the increase in volume of the crystalline phase that occurs therein when the crystallite melting temperature is exceeded.

It is also preferred to use acrylic or methacrylic monomers of the general formula $CH_2\!=\!C(R^1)(COOR^{2\prime\prime})$ which comprise acrylic and methacrylic esters, the group $R^{2\prime\prime}$ being selected from the group consisting of saturated, unbranched and branched, substituted and unsubstituted $C_1$ to $C_{14}$ alkyl radicals, more particularly $C_4$ to $C_9$ alkyl radicals. Specific examples, without wishing to be restricted by this enumeration, are methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate and their branched isomers, examples being isobutyl acrylate, 2-ethylhexyl acrylate, 2-ethylhexyl methacrylate, isooctyl acrylate or isooctyl methacrylate.

Further classes of compound which can be used are monofunctional acrylates and/or methacrylates of the general formula $CH_2\!=\!C(R^1)(COOR^{2\prime\prime\prime})$, the radical $R^{2\prime\prime\prime}$ being selected from the group of bridged and unbridged cycloalkyl radicals having at least 6 C atoms. The cycloalkyl radicals may also be substituted, for example by $C_1$ to $C_6$ alkyl groups, halogen atoms or cyano groups. Specific examples are cyclohexyl methacrylate, isobornyl acrylate, isobornyl methacrylate and 3,5-dimethyladamantyl acrylate.

In one preferred procedure, acrylic monomers and/or comonomers are used which contain one or more substituents, more particularly polar substituents, examples being carboxyl, sulphonic acid, phosphonic acid, hydroxyl, lactam, lactone, N-substituted amide, N-substituted amine, carbamate, epoxy, thiol, alkoxy, cyano, halide and ether groups.

Suitable with great advantage in the sense of acrylic monomer (a1) are monomers which are selected from the following group: substituted and unsubstituted compounds encompassing methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, isobutyl acrylate, 2-ethylhexyl acrylate, 2-ethylhexyl methacrylate, isooctyl acrylate, isooctyl methacrylate, cyclohexyl methacrylate, isobornyl acrylate, isobornyl methacrylate and 3,5-dimethyladamantyl acrylate.

Likewise suitable as comonomers (a2) are moderately basic comonomers such as singly or doubly N-alkyl-substituted amides, more particularly acrylamides. Specific examples here are N,N-dimethylacrylamide, N,N-dimethylmethacrylamide, N-tert-butylacrylamide, N-vinylpyrrolidone, N-vinyllactam, dimethylaminoethyl acrylate, dimethylaminoethyl methacrylate, diethylaminoethyl acrylate, diethylaminoethyl methacrylate, N-methylolacrylamide, N-methylolmethacrylamide, N-(butoxymethyl)methacrylamide, N-(ethoxymethyl)acrylamide, N-isopropylacrylamide, this enumeration as well not being conclusive.

Further preferred examples of comonomers (a2) are hydroxyethyl acrylate, hydroxyethyl methacrylate, hydroxypropyl acrylate, hydroxypropyl methacrylate, allyl alcohol, maleic anhydride, itaconic anhydride, itaconic acid, glycidyl methacrylate, phenoxyethyl acrylate, phenoxyethyl methacrylate, 2-butoxyethyl acrylate, 2-butoxyethyl methacrylate, cyanoethyl acrylate, cyanoethyl methacrylate, glyceryl methacrylate, 6-hydroxyhexyl methacrylate, vinylacetic acid, tetrahydrofurfuryl acrylate, beta-acryloyloxypropionic acid, trichloroacrylic acid, fumaric acid, crotonic acid, aconitic acid, dimethylacrylic acid, this enumeration not being conclusive.

In a further preferred procedure, use is made as comonomers (a2) of vinyl compounds, more particularly vinyl esters, vinyl ethers, vinyl halides, vinylidene halides, vinyl compounds with aromatic rings and heterocycles in alpha position, examples that may be mentioned including—not exclusively—vinyl acetate, vinylformamide, vinylpyridine, ethyl vinyl ether, vinyl chloride, vinylidene chloride, styrene and acrylonitrile, for instance.

With particular advantage the at least one comonomer (a2) may be a photoinitiator having a copolymerizable double bond, selected more particularly from the group containing Norrish I photoinitiators or Norrish II photoinitiators, benzoin acrylates or acrylated benzophenones.

In a further preferred procedure, the comonomers (a2) described are admixed with additional monomers which possess a high static glass transition temperature. Suitable such additional monomers include aromatic vinyl compounds such as, for instance, styrene, in which case preferably the aromatic rings are composed of $C_4$ to $C_{18}$ units and can also contain heteroatoms. Particularly preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, tert-butylphenyl acrylate, tert-butylphenyl methacrylate, 4-biphenyl acrylate and 4-biphenyl methacrylate, 2-naphthyl acrylate and 2-naphthyl methacrylate, and also mixtures of these monomers, this enumeration again being not conclusive.

Instead of or in addition to PSAs, the planar element of the invention may comprise hotmelt adhesives for the self-adhesive. Suitable hotmelt adhesives include in principle all hotmelt adhesive systems having suitable hotmelt-adhesive properties, in other words systems with hotmelt tack. A planar element with hotmelt tack for the purposes of the present invention is a planar element of the invention where, following application in melt form to the substrate and subsequent cooling, the bond strength at room temperature in accordance with ASTM D 3330-04 (with a removal speed of 300 mm/min on the bond substrate) is greater than 1 N/cm, more particularly greater than 3 N/cm or even greater than 5 N/cm.

Hotmelt adhesives which can be used are all customary and suitable hotmelt adhesives, examples being those based on synthetic rubbers, on thermoplastic materials, on elastomers with modifier resins, on acrylic acid derivative-vinyl copolymers and on acrylate-containing block copolymers.

Of these adhesives, those which have emerged as being advantageous are, in particular, those from the group encompassing polyolefins and copolymers of polyolefins and also their acid-modified derivatives, ionomers, polyamides and their copolymers, and also block copolymers such as styrene block copolymers, reference being made first to the above-described partially crystalline adhesives, which may of course also be employed for the self-adhesive. With the aid of adhesive systems of this kind it is possible to control the adhesive properties of the planar element to a particularly broad extent, in conjunction with high bond strength, and they can therefore be custom-tailored to the specific circumstances of the bond to be obtained.

These and other PSAs and hotmelts are amenable, furthermore, to modification in order to perform still further adaptation of their properties. Thus the self-adhesives used for the planar elements of the invention are typically additionally crosslinked, the aim being to achieve high degrees of crosslinking, which have the effect in particular, among others, of boosting the PTC effect (compare EP 0 311 142 A1 and also U.S. Pat. No. 4,775,778 A) and are therefore especially suitable for the self-adhesive. Crosslinking also eliminates or reduces the consequences of the NTC (Negative Temperature Coefficient) effect, which is occasionally observed at temperatures above the melting point of the self-adhesive.

According to one preferred embodiment of the invention a base polymer of the self-adhesive preferably has a degree of crosslinking which corresponds at least to a gel value of 35%, more particularly of more than 60%. The gel value in the present case is the ratio of the fractions of a base polymer that are not soluble in a suitable solvent (toluene or xylene, for example) to the sum of soluble fractions and non-soluble fractions of the base polymer.

A high degree of crosslinking may be obtained, for instance, in a crosslinking step with electron beams. Typical irradiation equipment that may be employed encompasses linear cathode systems, scanning systems (scanner systems) or segmented cathode systems, provided that these are electron beam accelerators. A comprehensive description of the state of the art, and the most important process parameters, are found in Skelhorne, "Electron Beam Processing", in "Chemistry and Technology of UV and EB Formulation for Coatings, Inks and Paints", Vol. 1, 1991, SITA, London. Typical acceleration voltages are situated in the range between 50 kV and 500 kV, preferably in the range between 80 kV and 300 kV. The scatter doses employed range between 5 kGy to 150 kGy, more particularly between 20 kGy and 100 kGy. It is also possible to use other processes which allow high-energy irradiation.

A further possibility, in accordance with the invention, is to bring about a variation in the electrical conductivity and hence in the thermal heating via the degree of crosslinking. By raising the electron beam dose that is active in a crosslinking reaction (and consequently raising the degree of crosslinking) it is possible to raise the electrical conductivity, so that, with a constant flow of current through the heating layer of the planar element, there is an increase in the attainable temperature of the self-adhesive. It is likewise possible to control the posistor behaviour of the self-adhesive via the degree of crosslinking.

To reduce the radiation dose needed for a crosslinking reaction it is additionally possible to admix the self-adhesive with crosslinkers and/or crosslinking promoters, more particularly those which are excitable thermally or by means of electron beams. Suitable crosslinkers for electron beam crosslinking include, for instance, difunctional or polyfunctional acrylates or methacrylates, or triallyl cyanurates and triallyl isocyanurates. Thermally activable crosslinkers admixed are preferably difunctional or polyfunctional epoxides, hydroxides, isocyanates or silanes.

A self-adhesive may of course comprise further formulating ingredients and/or adjuvants such as, for example, auxiliaries, pigments, rheological additives, adhesion promoter additives, plasticizers, resins, elastomers, ageing inhibitors (antioxidants), light stabilizers, UV absorbers and also other auxiliaries and additives, examples being driers (for instance, molecular sieve zeolites or calcium oxide), flow agents and flow control agents, wetters such as surfactants or catalysts and also thermally conducting fillers, heat-storing fillers or adjuvants which are released by heat or whose release is supported by heat.

Auxiliaries which can be used are all finely ground solid additives such as, for example, chalk, magnesium carbonate, zinc carbonate, kaolin, barium sulphate, titanium dioxide or calcium oxide. Further examples are talc, mica, silica, silicates or zinc oxide. Mixtures of the substances stated may of course also be used.

The pigments employed may be organic or inorganic in nature. All kinds of organic or inorganic colour pigments are suitable, examples being white pigments such as titanium dioxide, for improving the light stability and UV stability, or metal pigments.

Examples of rheological additives are fumed silicas, phyllosilicates (bentonites, for example), high molecular mass polyamide powders or powders based on castor oil derivatives.

Possible examples of adhesion promoter additives include substances from the groups of the polyamides, epoxides or silanes.

Examples of plasticizers for enhancing the adhesion capacity are phthalic esters, trimellitic esters, phosphoric esters, adipic esters and esters of other acyclic dicarboxylic acids, fatty acid esters, hydroxycarboxylic esters, alkylsulphonic esters of phenol, aliphatic, cycloaliphatic and aromatic mineral oils, hydrocarbons, liquid or semi-solid rubbers (for example nitrile rubbers or polyisoprene rubbers), liquid or semi-solid polymers of butene and/or isobutene, acrylic esters, polyvinyl ethers, liquid resins and plasticizer resins based on the raw materials that also constitute the basis for tackifying resins, woolwax and other waxes, silicones and also polymer plasticizers such as polyesters or polyurethanes, for instance.

Adjuvants which are released by heat or whose release is supported by heat are those systems which include an active substance which, as a result of exposure to heat, is released or activated, thereby allowing controlled delivery of this active substance. A suitable active substance in this context is any substance which develops a particular activity on thermal release or activation: for example, a dye, an active medical or cosmetic substance or a detonator (initial explosive). The activity may begin, for instance, as a result of the release of the substance (as in the case of a topically applicable active substance, for example) or on thermal activation, for instance a thermally initiated chemical reaction (for example, a molecular rearrangement, a crosslinking reaction or a decomposition) or a thermally initiated physical process (for example, an adsorption/desorption or a phase transition). The adjuvant which can be released by heat may be, for example, a topically applicable active medical substance which is encapsulated in a meltable matrix.

The formulating of the adhesive with further constituents such as auxiliaries and plasticizers, for example, is likewise state of the art.

To optimize the technical properties it is possible to admix the self-adhesives of the invention with resins. Tackifying resins (bond strength enhancer resins) that can be used for addition include, without exception, all of the known tackifier resins described in the literature. Representatives include the pinene resins, indene resins and rosins, their disproportionated, hydrogenated, polymerized and esterified derivatives and salts, the aliphatic and aromatic hydrocarbon resins, terpene resins and terpene-phenolic resins, and also $C_5$ to $C_9$ and other hydrocarbon resins. Any desired combinations of these and additional resins may be used in order to adjust the properties of the resultant adhesive in accordance with requirements. Generally speaking, it is possible to use all resins that are compatible (soluble) with the corresponding base polymer; reference may be made more particularly to all aliphatic, aromatic and alkylaromatic hydrocarbon resins, hydrocarbon resins based on pure monomers, hydrogenated hydrocarbon resins, functional hydrocarbon resins and natural resins. One preferred version uses resins which do not reduce the electrical conductivity and the heatability, even over a prolonged period of time.

A further advantageous embodiment of the planar element can be achieved by adding a heat-storing filler to at least one of the layers. A heat-storing filler is understood in the present case to be any filler having a high heat capacity, more particularly having a heat capacity of more than 0.7 J/gK. As a result of the thermal buffer effect of these substances, it is possible in this way to achieve a uniform profile on heating and also a prolonged and uniform delivery of heat after the end of the active process of heat generation. Fillers with a high heat capacity that can be used with advantage include, for instance, aluminium, beryllium, boron, calcium, iron, graphite, potassium, copper, magnesium, phosphorus or compounds of the aforementioned substances, especially aluminium oxide and aluminium chloride, calcium carbonate, calcium chloride, copper sulphate, magnetite, haematite, magnesium carbonate and magnesium chloride, phosphorus chloride or phosphorus oxide (it also being possible for these substances, furthermore, to fulfil further functions within the planar element, such as potassium or phosphorus in the case of detonators).

It is also advantageous if at least the self-adhesive layer has a high thermal conductivity, more particularly of at least 0.5 W/m·K, very preferably of more than 1 W/m·K. This can be achieved, for instance, by addition of thermally conducting fillers, especially of electrically insulating but highly thermally conducting fillers such as, for instance, boron nitride or aluminium oxide, since the latter do not affect the electrical properties. It is, however, also possible to use electrically conductive fillers with a high thermal conductivity, examples being silver, aluminium or copper. PSAs with particular thermal conductivity allow the energy that is needed to melt a hotmelt to be introduced more effectively, leading, for instance, to shortened cycle times when the planar element of the invention is applied to the bonding substrate.

In addition to the heating layer and the contacting layer, the planar element of the invention may have further layers. Thus, for instance, it is possible for the planar element to comprise further layers of adhesives, by the provision, for instance, of a further self-adhesive on the side face of the heating layer that faces away from the perforated contacting element. This adhesive as well may be any suitable pressure-sensitive adhesive or hotmelt adhesive: for example, a self-adhesive with one of the base adhesives described above. By this means it is possible to decouple the technical properties of the two side faces of the planar element from one another, thereby allowing a particularly high bonding stability to be achieved overall, since the adhesives on the self-adhesive side faces of the planar element can be adjusted individually to the particular bond substrate, something which is especially important when the materials of the substrate to be joined to the obverse of the planar element are significantly different from those of the substrate to be joined to the reverse of the planar element, as in the case, for instance, of a glass-like or metallic contacting element and a polyolefinic bond substrate.

In a further advantageous embodiment at least one layer of the heatable planar element is equipped with a mechanism which on first heating of the planar element leads to an increase in cohesion in the self-adhesive and/or, where appropriate, in a further self-adhesive. This may be achieved, for example, via an increase in the crosslinking density as a result of a thermally initiated post-crosslinking, which may be initiated in particular by the (intrinsic) heating of the planar element itself. Advantageously, therefore, a planar element of this kind is used in such a way that first the bond with at least one bonding substrate is produced and then the first heating is performed, in the course of which there is a solidification of the bond.

The planar element is typically of backing-free form, since this ensures maximum flexibility of the planar element overall in tandem with minimal installation depth. For particularly high mechanical stability, however, there may also be a flexible permanent backing in the planar element. This backing may be used, for instance, to achieve an overall improvement in the mechanical properties of the planar element, such as its puncture resistance, for example. As permanent backings of this kind it is possible to use all suitable backing materials, such as foils of metal and/or films of plastics, textile planar elements (for example woven, laid, knitted and nonwoven fabrics) or combinations of such materials. These permanent backings as well may be closed over their full area or of perforated design. Where a permanent backing of this kind is provided, however, it is necessary in accordance with the invention that it is not in direct contact with the contacting element but is instead arranged at most on the self-adhesive layer.

It is advantageous in this case if the permanent backing as well, in addition to its high flexibility, has a high thermal conductivity, more particularly a thermal conductivity of at least 0.5 W/m·K or even of more than 1 W/m·K. Particularly preferred materials are polymers filled with thermally conductive fillers such as boron nitride or aluminium oxide. Permanent backings of this kind typically have a thickness of less than 50 µm, preferably of less than 25 µm, in order not to detract from the flexibility of the construction as a whole. Through particularly thermally conductive backings it is possible more effectively to introduce the energy that is needed to melt a hotmelt adhesive, resulting, for instance, in short cycle times when the planar element of the invention is applied to the bonding substrate. In one particularly advantageous embodiment the permanent backing takes the form of a polymeric foam, since this does not substantially detract from the flexibility of the planar element as a whole.

The planar element may further have a temporary backing in the form of a protective sheet on its obverse face and/or on its reverse, to improve the handling qualities of the planar element before and during bonding. This allows unintended sticking during preparation, storage and bonding to be avoided, so making these steps easier to implement. As a temporary backing of this kind it is possible to use any release-effect liner material, such as a release paper or an in-process liner, which at least partly covers one of the outer self-adhesives. Examples of suitable liner material include all siliconized or fluorinated films having a release effect which are residuelessly redetachable. Film materials that may be mentioned here include, only by way of example, PP (polypropylene), BOPP (biaxially oriented polypropylene), MOPP (monoaxially oriented polypropylene), PET (polyethylene terephthalate), PVC (polyvinyl chloride), PU (polyurethane), PE (polyethylene), PE/EVA (polyethylene-ethylenevinyl acetate copolymers) and EPDM (ethene-propylenediene terpolymers). It is also possible, moreover, to use release papers, examples being glassine papers, kraft papers or polyolefinically coated papers.

Particular advantage attaches to using liner materials which themselves have a high thermal conductivity, more particularly a thermal conductivity of at least 0.5 W/m·K or even of more than 1 W/m·K. Particularly preferred materials are polymers filled with thermally conductive fillers such as boron nitride or aluminium oxide. Through particularly thermally conductive liner materials it is possible more effectively to introduce the energy that is needed to melt a hotmelt adhesive, resulting, for instance, in short cycle times when the planar element of the invention is applied to the bonding substrate.

The planar element accordingly comprises at least one layer within which heat can be generated, this layer being pressure-sensitively adhesive or hotmelt-adhesive, and a discontinuous electrically conductive layer which constitutes at least one electrode (one pole) of the contacting layer. It is important here that the contacting element has a self-adhesive only on one of its side faces. At its most simple, accordingly, the planar element is a corresponding layering of adhesive with a contacting layer disposed thereon.

For producing the planar elements of the invention it is possible without exception to employ all known and suitable methods. Thus the polymeric pressure-sensitive adhesive layers or hotmelt-adhesive layers of the planar element of the invention can be produced by the familiar methods of producing polymeric planar elements in accordance with the prior art. These include, for instance, flat film extrusion, blown film extrusion, the calender method, and coating from a solution, from a dispersion or from a monomeric or prepolymeric precursor of the polymer.

To produce the planar elements, customarily the self-adhesive is first spread out in the form of a stratum, on a permanent or temporary backing, as for example on a liner material or on a production backing—a so-called in-process liner—for instance, which is separated from the planar element again during the process or by no later than the end of the process. The contacting element is applied to this self-adhesive layer.

It is of course also possible to obtain the planar element of the invention in any other production method that deviates from the one above; for example, by first applying the contacting element to a temporary backing, then joining it with the self-adhesive, and then removing the temporary backing from the contacting element.

To apply the contacting element to the self-adhesive or, where appropriate, to the temporary backing it is possible to use all of the known methods, such as the application (printing, for example) of conductive varnishes, conductive pastes or conductive inks, transfer from metal sheets, foils or layers (those made of metals, for example) by means of hot stamping, heat sealing, laminative application or discontinuous application of mixtures of polymers and conductive fillers (polymer/carbon black compounds, for example), it being necessary in the latter case for the contacting element to have a conductivity which is higher by a factor of at least 10 than the conductivity of the intrinsically heatable self-adhesive.

In one simple embodiment of such a method the heatable self-adhesive is contacted with an electrically conductive metal mesh or metal grid. In a preferred way, metals are used which exhibit little or no corrosion over a relatively long period of time. Some very preferred embodiments, for example, use copper or aluminium, although contacting may also be performed using silver or gold.

In one preferred embodiment the metal can be deposited directly on the self-adhesive, by electroplating or vapour deposition methods, for instance, or by laser methods, or else may be laminated on in the form of a continuous or perforated layer, by being transferred from an in-process liner.

Where conductive varnish, a conductive liquid ink, a conductive printing ink, an intrinsically conductive polymer or a polymer/conductive substance mixture is used, preference is given to printing methods, particularly, for instance, to screen printing, since in this way the discontinuous contacting layers can be applied particularly easily, variably and reproducibly. Printing may take place from a solution, from a dispersion or from a melt; provision may then be made for a subsequent curing step.

In the context of the production of the planar element of the invention it may be particularly advantageous to carry out this production in accordance with a method in which first of all an adhesive coating is produced from the self-adhesive (for instance by applying the adhesive to a temporary liner) and in which the perforated contacting element is then applied directly to the top face of the resulting stratum, it being possible, where appropriate, for this to take place under applied pressure.

In accordance with the invention the planar elements are used for connecting two bonding substrates to one another or else for connecting two different sub-regions of a single bonding substrate. Since the planar element, though only in single-sided self-adhesive form in the storage condition, is nevertheless double-sidedly bondable on bonding, it is adapted for adhesively connecting the surfaces of two bonding substrates to one another. More particularly the planar element finds application for the bonding of bonding substrates in the vehicle industry, and is used, for instance, in cars, buses, railways, ships or aircraft.

The planar element of the invention may be present as part of an adhesively bonded assembly. An adhesively bonded assembly for the present purposes is any assembly, obtained by means of adhesive bonding, of a planar element and at least one bonding substrate which is bonded either to a self-adhesive side face of the planar element directly or via further parts. As a bonding substrate it is advantageous to use a mirror sheet, more particularly the reverse of the mirrored side of a mirror sheet, or, in the case of a transparent planar element, a viewing sheet, such as a display window or a windscreen, for example. In systems of this kind, the high inherent weight of the bonding substrate makes detachment of the bonding substrate from the mount, and the potentially resultant destruction of the bonding substrate, a particular problem, and so here it is necessary to ensure a particularly high bonding strength. Accordingly the planar element of the invention can be used for heating an adhesively bonded assembly of this kind.

Thus the planar element of the invention can be used, for instance, as a mirror heater (exterior and interior mirrors), in a heatable inner liner (fastening, sound damping, heating), for heating screenwash or providing an anti-freeze function, for tank heating (especially for diesel vehicles), for the heating of fuel lines (at the same time as fastening), in a heater for deicing systems (wing deicing, possibly including fastening functions), in a steering wheel heater, for warming heating air (additional heating when an engine is cold) or for preheating intake air (combustion air). This list is purely exemplary, and the application of the planar element of the invention is not restricted solely to these specific examples.

Furthermore there are a multiplicity of other applications that can be found, for example (without imposing any restriction as a result of this selection): for preventing condensation or misting on surfaces (for example in the case of bathroom mirrors, for fastening and heating, as an anti-mist lamination for bathroom applications, for instance, or as a heatable tile adhesive sheet, on corrective spectacles or sunglasses or in spectacle cases), as seat heating (in cars, for example, including the integrated application of seat heating and seat occupancy sensor for airbags), for seating at bus stops, in sports stadiums, in outdoor catering or for toilet seats, in electric overblankets or underblankets, in plates for keeping things warm (such as for foods and meals, but also in mountaineering cookers or mountaineering ovens, especially in association with the use of solar cells), in footwear warmers (as an insole, for instance), in band heaters (for pipelines, tanks and the like, for instance), for room heating (for example in wall heaters, floor heaters or else as a foldable tent heater), in water-bed heaters, in heatable housings (for example as a so-called thermobox for conditioning the temperature of the contents of the casing, or in the electronics sector, for instance in interaction with a Peltier element for ensuring a constant temperature in hifi equipment), for motorcycles (for example as steerer heating or saddle heating), as greenhouse heating (for example as large-area radiant heating or convection heating or as small-area local heating directly to the plants, for instance as root heating), for functionally heatable clothing (for example in motorcycle rider clothing, car driver clothing or winter clothing), for heating and, where appropriate, fastening of display systems (for example of LCDs, OLEDs and electrophoretic displays, for instance as anti-freeze protection for displays in cameras or outdoor displays, or in church tower clocks, for instance for their deicing), for heating heated exterior switches, for roof heating (for example as a thawing unit for roofs or gutters), in incubators (for example for young animals, for egg hatching or for human babies), in medical therapy (for example in thermotherapy on the surface of a human or animal body, as heating patches and also for transdermal therapeutic systems and for transdermal drug delivery, where an encapsulated active ingredient which can be released by means of heat, or whose release is assisted by heat, is liberated to the surface of the skin or surface of a pelt, producing a temporally and quantitatively controlled release of the corresponding active substances) or as detonators.

To connect the planar element of the invention to two bonding substrates it is possible to carry out any desired bonding methods. In view of the particular form of the planar element, however, it is necessary for the planar element first to be connected on its reverse to a first bonding substrate, or at least contacted therewith, before the obverse can be connected to a second bonding substrate, since the self-adhesive passes to the obverse of the planar element only after such a procedure. This of course does not rule out the contacting initially of both bonding substrates with the planar element before a bond is produced, since bonding of the obverse, even in the case of this simplified procedure, by virtue of the structure of the planar element of the invention, takes place only after the reverse has been connected to the first bonding substrate.

Accordingly, the method of connecting the planar element to the second bonding substrate comprises at least the following steps: the planar element is brought into contact with the (second) bonding substrate in such a way that the second side face of the contacting layer touches a region of the surface of the bonding substrate and so forms a loose preassembly, the intrinsically heatable self-adhesive passes through the cutouts in the contacting element and at least partly fills them, and the obverse of the planar element is bonded to the second bonding substrate by way of the intrinsically heatable self-adhesive which has passed through the cutouts.

In the case of the first contacting of the planar element and of the second bonding substrate, the second side face of the contacting layer touches a region of the surface of the bonding substrate, without these adherends entering into a stable adhesive bond with one another. This does not, however, rule out the possibility of preliminary fixing, in which the planar element and the second bonding substrate attach to one another redetachably. In that case, the planar element and the second bonding substrate form an insecure and therefore loose preassembly, in other words an assembly prior to actual joining.

The intrinsically heatable self-adhesive then passes through the cutouts in the contacting element; that is, passage of the intrinsically heatable self-adhesive through the cutouts of the contacting element is effected. This passage may be obtained in any desired way. Typically this may occur by the first bonding substrate being guided to the reverse of the planar element and bonded to it. The first bonding substrate can either be contacted with the planar element before the second bonding substrate (which means that the first bonding substrate as well is part of the preassembly) or else contacted with the second bonding substrate only after the planar element has been contacted (meaning that the first bonding substrate did not become part of the preassembly).

The passage of the intrinsically heatable self-adhesive through the cutouts in the contacting element may be assisted by pressing together the preassembly composed of planar element and bonding substrate. Instead of this or additionally, the preassembly composed of planar element and bonding substrate may be heated. In this way the self-adhesive passes particularly rapidly through the contacting layer.

Alternatively, however, passage may be achieved without using the first bonding substrate, as for instance by disposing the preassembly with the second bonding substrate to the bottom, with the self-adhesive flowing of itself, under the action of gravity, through the cutouts in the contacting element; this, however, presupposes a self-adhesive of sufficiently low viscosity, and also suitable cutouts. An effect similar to that of the Earth's gravity could also be achieved, for example, by using a centrifuge.

Finally, the obverse of the planar element is bonded on the second bonding substrate and hence also with the second bonding substrate via the intrinsically heatable self-adhesive that has passed through the cutouts.

In accordance with the particular self-adhesive used, the actual bonding of the planar element may take place under applied pressure to the bonding substrate (in the case of a pressure-sensitive adhesive) or else with introduction of heat (in the case of a hotmelt adhesive) in the latter case optionally with additional applied pressure on the planar element to the bonding substrate. In that case the introduction of heat takes place from the outside; alternatively, however, the heat needed to obtain a stable bond can also be generated intrinsically in the heating layer.

Figure 2:
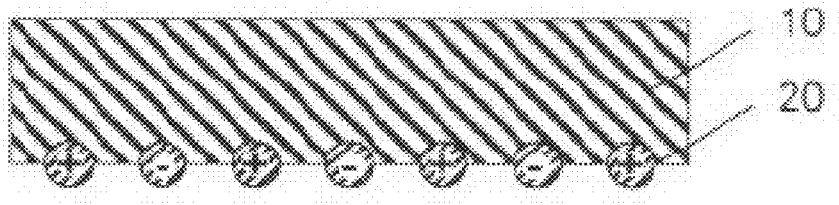
Figure 2:
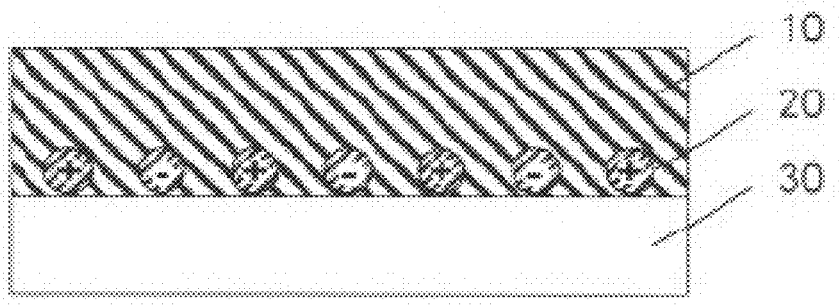
Figure 3:
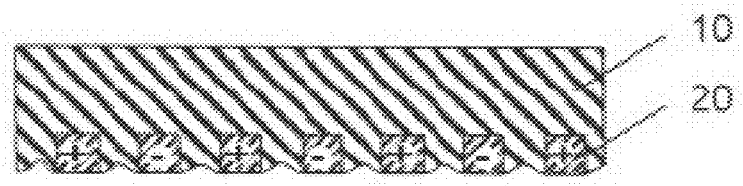
Figure 3:
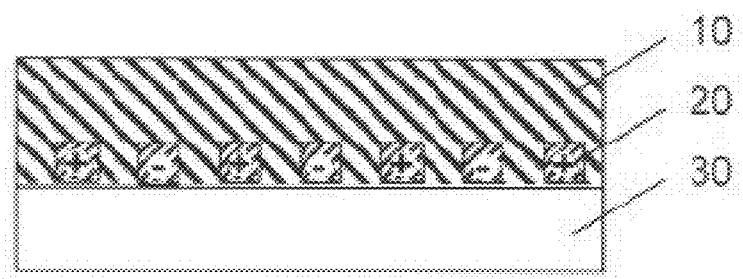

Further advantages and application possibilities will become apparent from the working examples, which are to be described in more detail below with reference to the attached drawings. In these drawings FIG. 1 shows schematic representations of longitudinal sections through an inventive planar element in accordance with a first exemplary embodiment, FIG. 2 shows schematic representations of longitudinal sections through an inventive planar element in accordance with a second exemplary embodiment, and FIG. 3 shows schematic representations of longitudinal sections through an inventive planar element in accordance with a third exemplary embodiment, where in each case the upper representation a) shows the planar element in the unbonded state (storage condition) and the lower representation b) shows the planar element in the single-sidedly bonded state.

Figure 4:
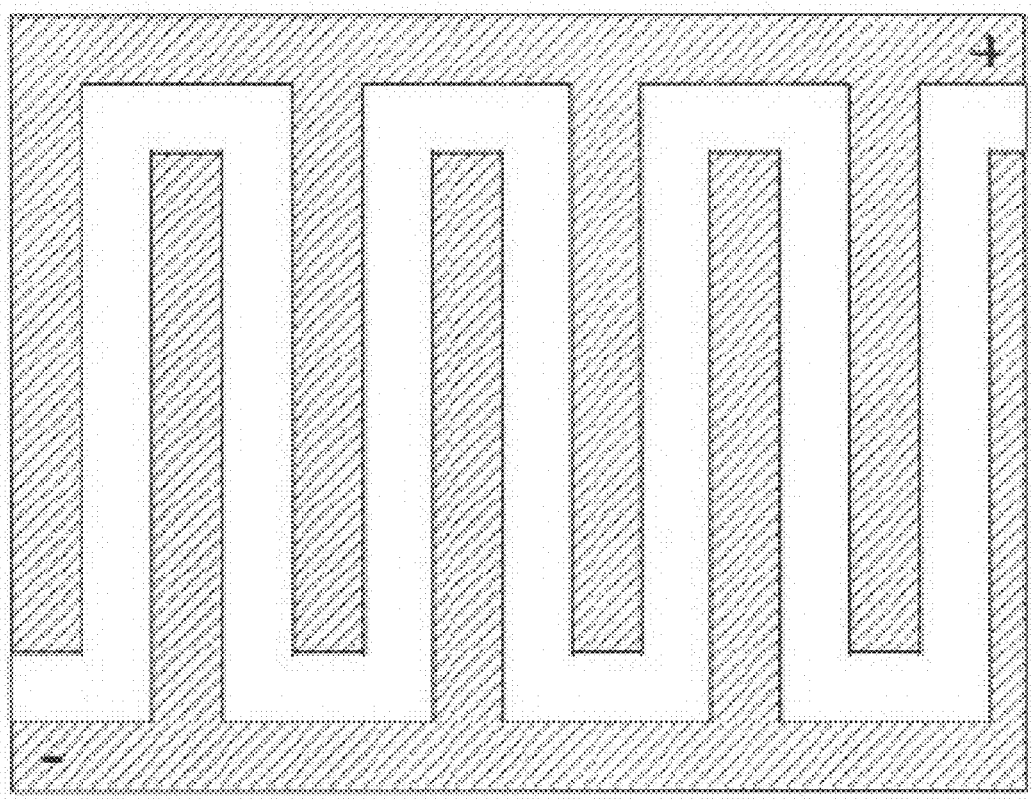
Figure 5:
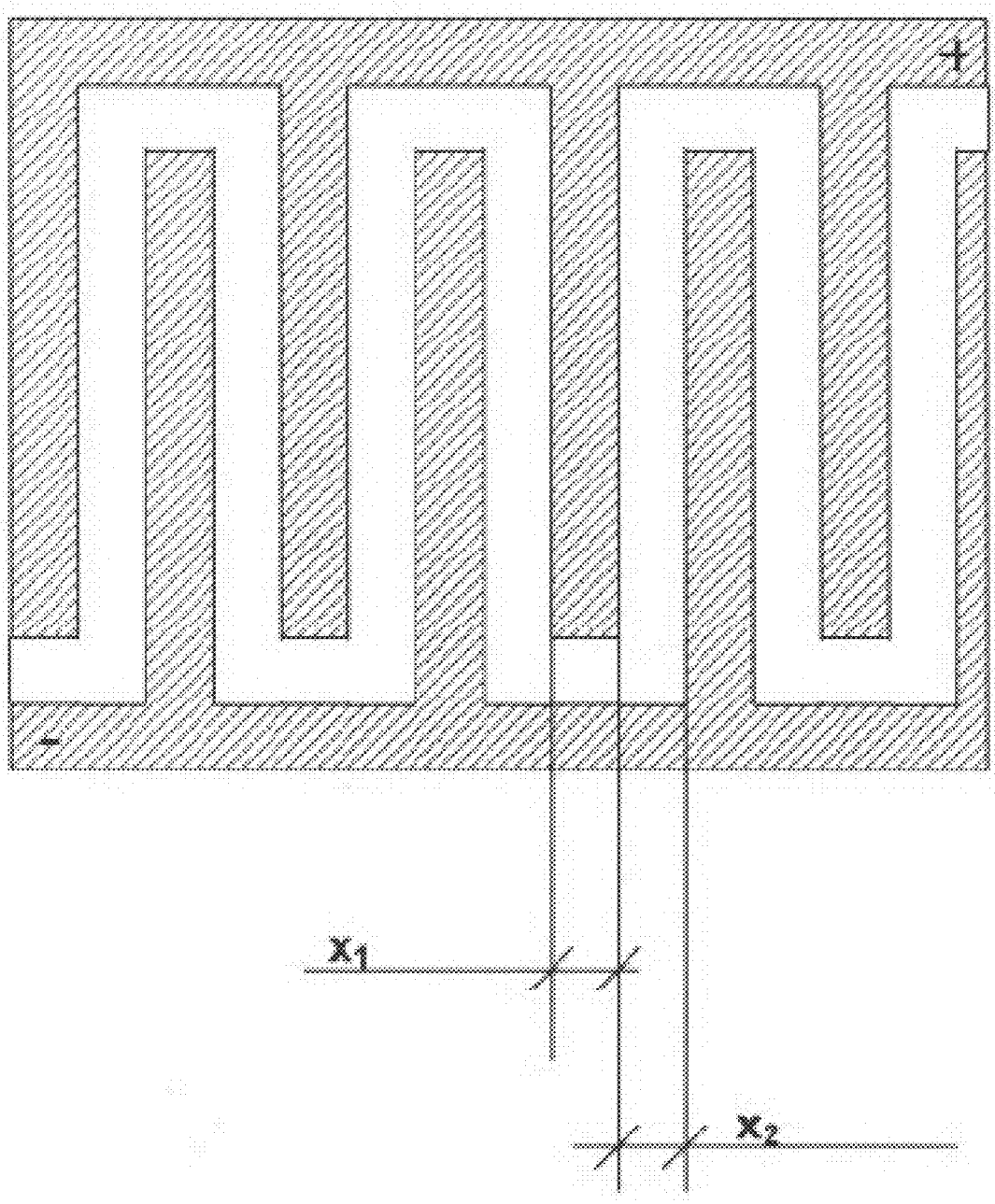
Figure 6:
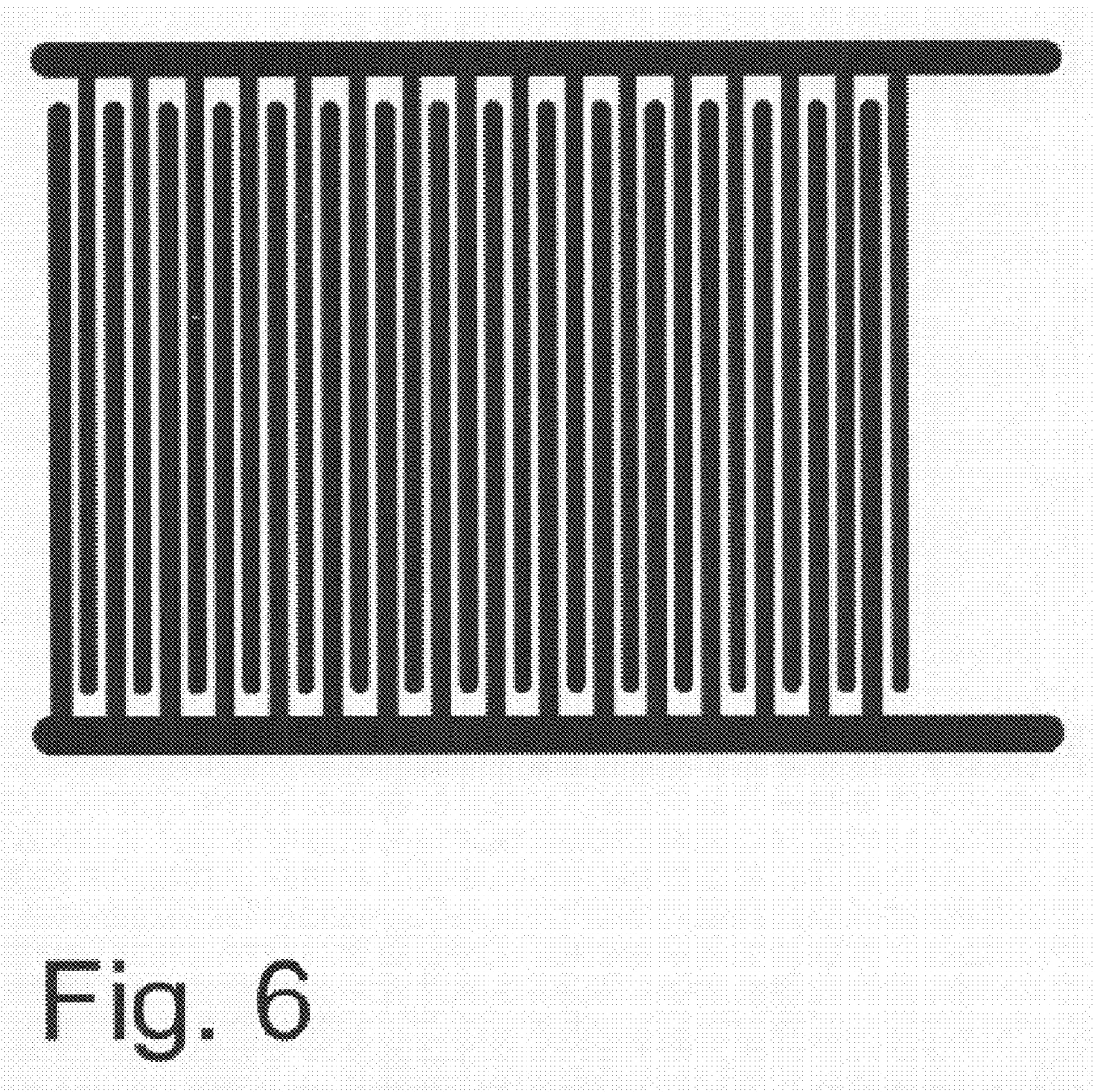
Figure 7:
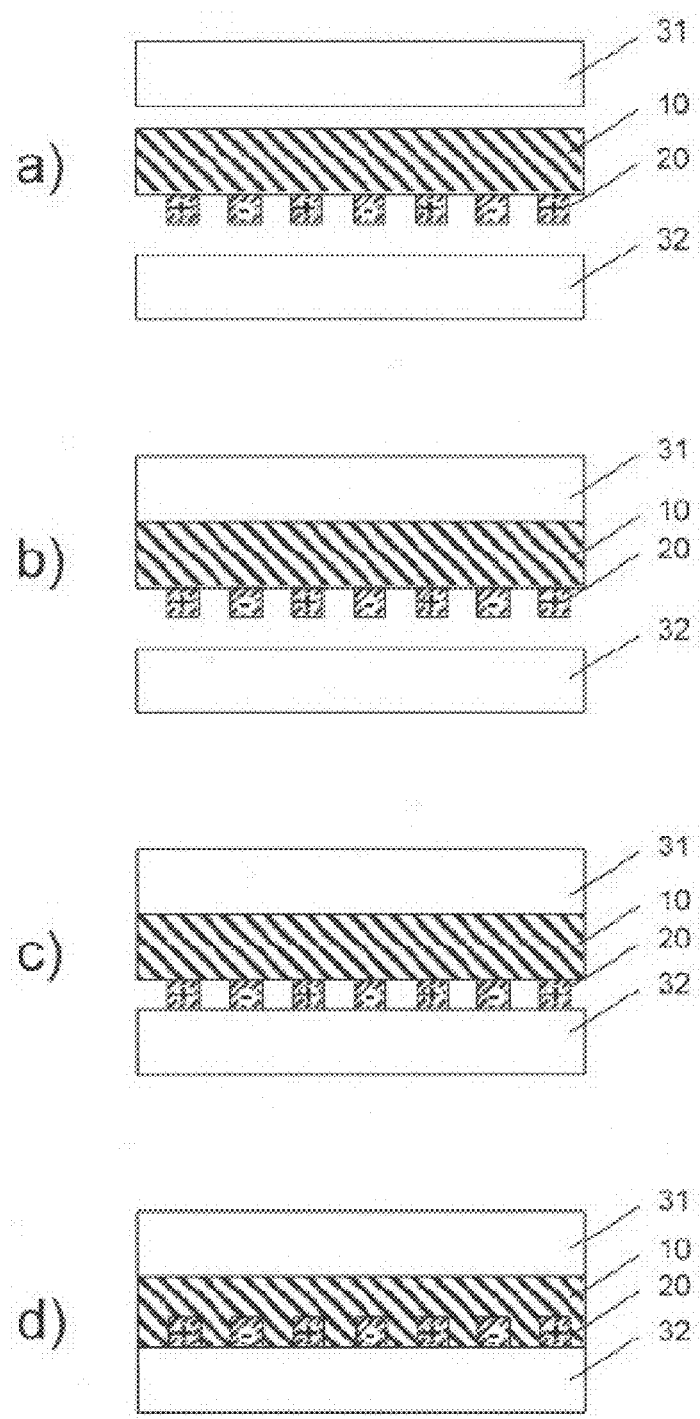
Figure 8:
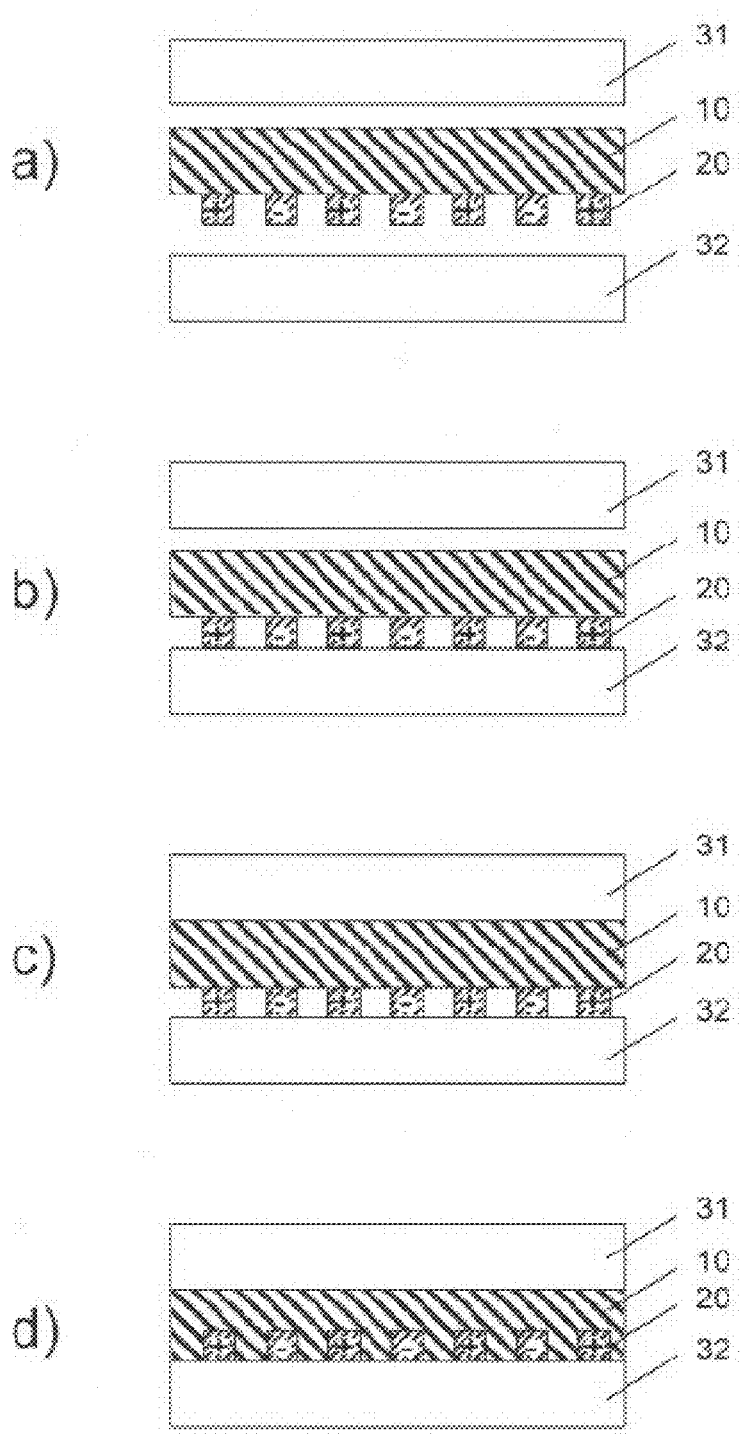
Figure 9:
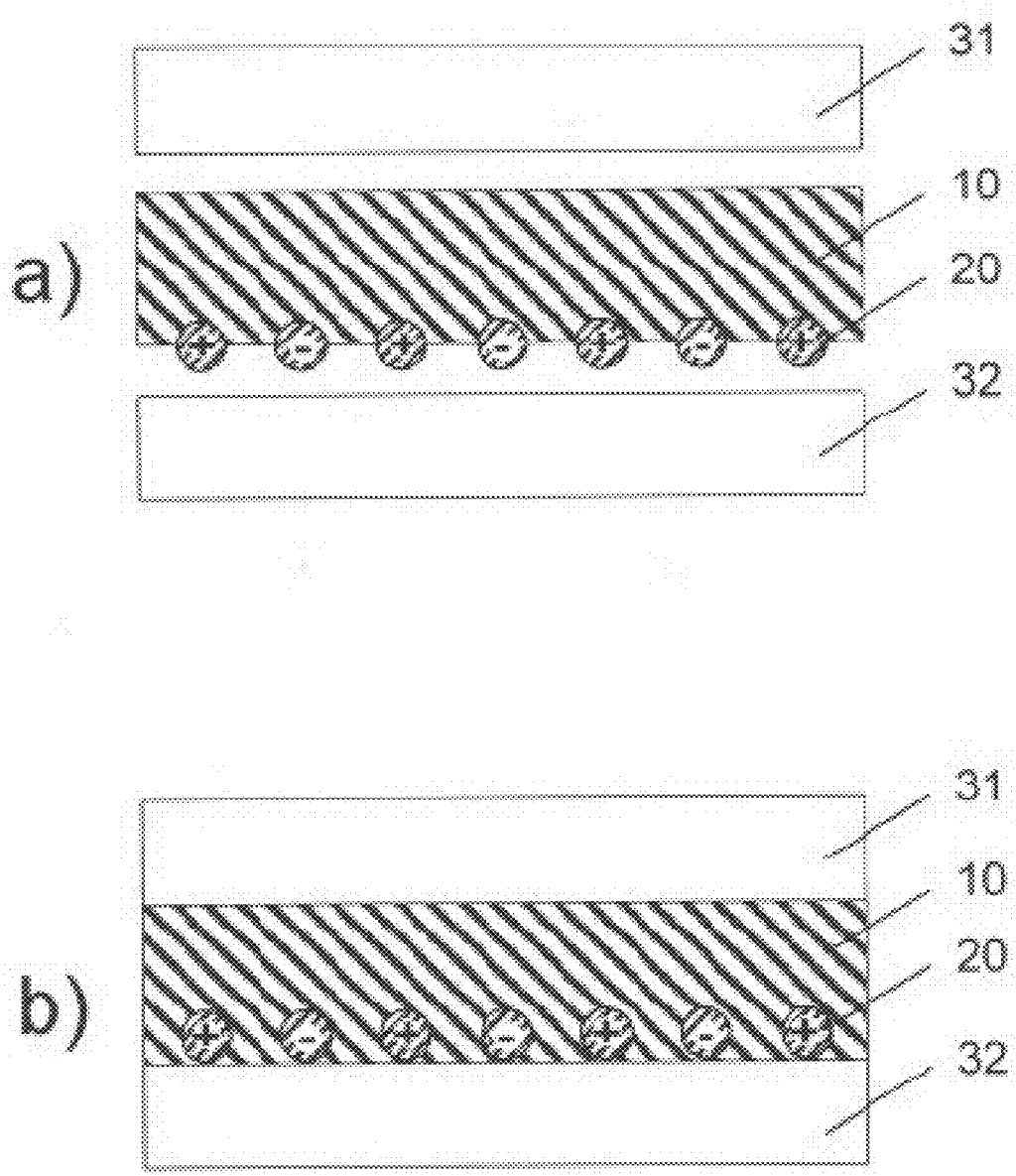
Figure 10:
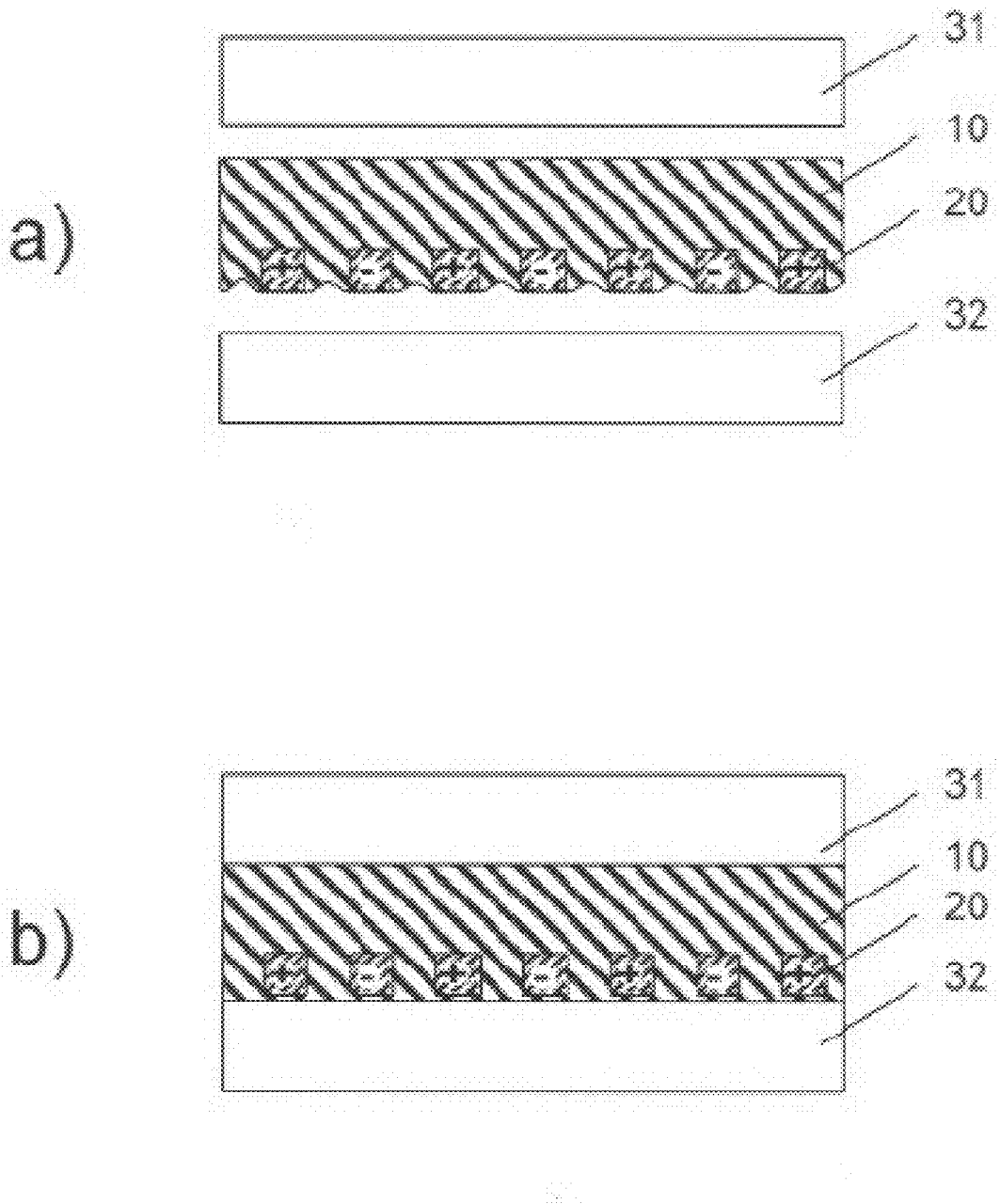

Furthermore,

FIG. 4 shows a plan view of an exemplary spatial embodiment of the contacting element, FIG. 5 shows a plan view of the contacting element reproduced in FIG. 4, with the bridge-shaped regions additionally being specified in this representation, FIG. 6 shows a plan view of a further exemplary spatial embodiment of the contacting element, FIG. 7 shows schematic representations of longitudinal sections through an inventive planar element in accordance with the first exemplary embodiment, at different points in time in the course of the bonding of the planar element to two bonding substrates, in accordance with a first procedure, FIG. 8 shows schematic representations of longitudinal sections through an inventive planar element in accordance with the first exemplary embodiment, at different points in time in the course of the bonding of the planar element to two bonding substrates, in accordance with a second procedure, FIG. 9 shows schematic representations of longitudinal sections through an inventive planar element in accordance with the second exemplary embodiment, before and after the bonding of the planar element to two bonding substrates, and FIG. 10 shows schematic representations of longitudinal sections through an inventive planar element in accordance with the third exemplary embodiment, before and after the bonding of the planar element to two bonding substrates.

Each of the planar elements described exemplarily below has a heatable self-adhesive 10 and a contacting element 20.

FIG. 1 depicts an inventive planar element having a self-adhesive 10 and a contacting element 20, in accordance with a first exemplary embodiment. The planar element does not have a stabilizing backing film. The self-adhesive 10 is either pressure-sensitively adhesive or hotmelt-adhesive. Within the self-adhesive 10, as a heating layer, heat is generated when a current flows. Disposed between the adhesive strata, the contacting element 20 serves as a discontinuous electrically conductive layer of the contacting of the self-adhesive 10.

The contacting element 20 has a comb structure of uniform cross section, and the one sub-region of the contacting element 20 and the other sub-region of the contacting element 20 are not through-connected to one another, and so each of the two sub-regions is able to serve as a contact electrode of the intrinsically heatable self-adhesive 10, and the contacting element 20 therefore contains both contact electrodes (poles) (represented by the arbitrarily selected, different symbols "+" and "−"), and so an external counter-electrode is not required. The interaction of the two sub-regions of the contacting element 20 produces a flow of current through the self-adhesive 10, which runs essentially within the plane of the areal extent of the self-adhesive 10 (in other words in the xy plane) and only to a small extent perpendicular to it.

Section a) of FIG. 1 shows a longitudinal section through the inventive planar element in the unbonded state. The planar element is depicted in such a way that its obverse is located on the bottom side of the planar element and that its reverse, accordingly, is located on the top side of the planar element. The obverse of the planar element is formed by the bottom side face of the contacting layer as its second side face. The contacting layer comprises the contacting element 20 with the comb structure, the teeth of the comb possessing a rectangular cross-sectional area. The contacting element 20 has cutouts which extend through from the obverse of the planar element to the intrinsically heatable self-adhesive 10. With its first side face, the contacting element 20 lies flatly against the stratum comprising the self-adhesive 10. Over the entire thickness of the contacting layer, the cutouts contain no heatable self-adhesive 10 and are therefore not filled but instead are present in adhesive-free form in the region of the second side face. Consequently, in the arrangement depicted in Section a) of FIG. 1, the obverse of the planar element is not self-adhesive; this represents the storage condition of the inventive planar element.

Section b) of FIG. 1 depicts a longitudinal section through the planar element shown in Section a), but, in contradistinction to the situation shown in Section a), the element is pictured in the single-sidedly bonded state, in which the planar element is connected at its obverse (bottom side of the planar element) to a bonding substrate 30. For this purpose, the intrinsically heatable self-adhesive 10 has passed through the cutouts in the contacting element 20, and fills them. The self-adhesive 10 which is passed through attaches to the bonding substrate 30 in the region of the cutouts, and in this way produces the connection between the planar element and the bonding substrate 30.

Merely for the sake of completeness it may be pointed out that, in the context of the invention, rather than the two-pole version of the contacting element 20, it may also be present in the layer in the form of merely one single contacting electrode, which permits current flow only in assembly with a bonding substrate on which there is a further contacting electrode arranged, as an external counter-electrode. An external counter-electrode of this kind may be applied, for instance, as a thin metallic layer to the obverse of one bonding substrate. In interaction between contacting element 20 and external counter-electrode, a flow of current through the self-adhesive is then possible that runs essentially perpendicular to the areal extent of the self-adhesive (i.e. in the z direction). Although only the two-pole variants of exemplary embodiments of the inventive planar element are described below, the inventive concept likewise includes the one-pole variants for all of these embodiments.

Barring two differences, the planar element shown in FIG. 2, with a self-adhesive 10 and with a contacting element 20, in accordance with a second embodiment, is identical with the above-described planar element of the first embodiment. In Section a) of FIG. 2, a longitudinal section through the planar element in the storage condition is depicted, and, in Section b) of FIG. 2, a longitudinal section through the planar element in the single-sidedly bonded state on a bonding substrate 30 is pictured.

One difference from the planar element of the first embodiment is that the walls of the cutouts extend obliquely rather than perpendicularly to the areal extent of the planar element, and so the cross-sectional area of the teeth of the contacting element 20 has a circle-like rather than a rectangular cross section. A further difference from the planar element of the first embodiment is that the contacting element 20 does not lie flatly against the self-adhesive 10, but instead is partially embedded in it.

This produces the advantage, on the one hand, of better anchoring of the contacting element 20 in the self-adhesive during storage. As a result of the fact that the self-adhesive is able to flow around the teeth of the contacting element 20 on bonding, furthermore, the bonding area is increased and hence the strength of the bond on the bonding substrate is improved. Over this, the contacting element 20 presents a lower rheological resistance to the self-adhesive, as a result of the more favourable profile of the cutouts. This, however, may cause the self-adhesive to pass through the cutouts even during storage, and that may have the consequence of inadvertent bonding. This embodiment, therefore, is employed preferentially when using self-adhesives of high viscosity.

Except for one difference, the planar element shown in FIG. 3, with a self-adhesive 10 and a contacting element 20, in accordance with a third embodiment, is identical to the planar element of the first embodiment. Section a) of FIG. 3 depicts a longitudinal section through the planar element in the storage condition, and Section b) of FIG. 3 pictures a longitudinal section through the planar element in the single-sidedly bonded state on a bonding substrate 30.

The difference from the planar element of the first embodiment is that in the storage condition the cutouts in the contacting element 20 are already partly filled with self-adhesive 10, and yet the cutouts, which pass through over the thickness of the contacting element, are present in adhesive-free form in the region of the second side face of the contacting layer.

With the third embodiment as well, the advantage is produced of better anchoring of the contacting element 20 in the self-adhesive during storage. The distance the self-adhesive 10 has to travel within the cutouts in the operation of bonding in order to make contact with the bonding substrate 30 is very small in the case of a planar element of the third embodiment. Consequently it is easier here to bring about bonding, and so a planar element of the third embodiment may also comprise high-viscosity adhesives as the intrinsically heatable self-adhesive.

Reproduced in FIG. 4 is a plan view of an exemplary spatial embodiment of the contacting element, which is arranged in a comb structure with a uniform width of the teeth of rectangular cross section. The contacting element here comprises two sub-regions, which are not through-connected to one another, and so each of the two sub-regions may act as a contact electrode of the intrinsically heatable first self-adhesive, and the contacting element therefore contains both contact electrodes (represented by the different symbols "+" and "−"). FIG. 5 shows a plan view of the same contacting element, and in this representation, additionally, the width $x_1$ of the teeth and the width $x_2$ of the cutouts are drawn in within the comb structure. In a typical design, for example $x_1$ and $x_2$ may adopt values from a range from 0.1 mm to 10 mm, more particularly from 0.5 mm to 3 mm, and so $x_1$ may for instance possess a value of 3 mm and $x_2$ a value for instance of 1.5 mm.

A modification of the spatial orientation of the contacting element shown in FIG. 5 is reproduced as a plan view in FIG. 6. In this case the main strands of the contacting element on the right-hand side are extended beyond the heatable area, and so two contact tongues are formed there, provided for connecting the planar element to external connection leads.

The planar elements of the invention are joined to a bonding substrate or to two bonding substrates. The method of joining may be carried out in any suitable way. In FIG. 7, schematically, the different steps in the bonding of the inventive planar element shown in FIG. 1, with a self-adhesive 10 and a contacting element 20, to two bonding substrates, and namely a first bonding substrate 31 and a second bonding substrate 32, are shown in accordance with a first procedure.

FIG. 7 a) shows the planar element prior to joining to the two bonding substrates 31 and 32, and therefore separate from them. In the first joining step, shown in FIG. 7 b), the first bonding substrate 31 is then contacted with the reverse of the planar element, which carries the self-adhesive 10. Where the self-adhesive 10 is a pressure-sensitive adhesive, the planar element is bonded to the first bonding substrate 31. Where the self-adhesive 10 is a hotmelt adhesive, then, depending on procedure, the bonding of the planar element to the first bonding substrate 31 may take place at this stage already or else may not be carried out until later, in the form, for instance, of a combined bonding step, after the obverse of the planar element has been contacted with the second bonding substrate 32.

As depicted in FIG. 7 c), the obverse of the planar element is contacted with the second bonding substrate 32. Since at this point in time the self-adhesive 10 is not located in the joining plane between the contacting element 20 and the second bonding substrate 32, there is not yet any bonding there. In the subsequent step, shown in FIG. 7 d), the self-adhesive 10 passes through the cutouts in the contacting element 20 and comes into contact with the second bonding substrate 32, with the consequence that bonding may now take place there.

An alternative to the sequence shown in FIG. 7 in the bonding of the inventive planar element depicted in FIG. 1, with a self-adhesive 10 and a contacting element 20, to a first bonding substrate 31 and a second bonding substrate 32 is shown by FIG. 8. Here, FIG. 8 a) is identical to FIG. 7 a), FIG. 8 c) to FIG. 7 c), and FIG. 8 d) to FIG. 7 d), the sequence instead differing in that, in the first joining step, shown in FIG. 8 b), first the second bonding substrate 32 is contacted with the obverse of the planar element, before the planar element is brought into contact with the first bonding substrate 31. Since only the contacting element 20 is located on the obverse of the planar element, but no self-adhesive 10, there is in this case as yet no bonding, and instead a loose preassembly is formed.

With the loose preassembly retained, the reverse of the planar element is then contacted with the first bonding substrate 31 (FIG. 8c)), the self-adhesive 10 passes through the cutouts, and the two bonding substrates 31 and 32 are bonded to the planar element (FIG. 8 d)). Alternatively to this method, which is, so to speak, carried out in reverse to the sequence depicted in FIG. 7, the first bonding substrate 31 and the second bonding substrate 32 may also be contacted simultaneously with the planar element.

FIG. 9 shows the inventive planar element of the second exemplary embodiment, and FIG. 10 the inventive planar element of the third exemplary embodiment, before and after the bonding of the planar element to two bonding substrates 31 and 32. In both joining methods, either first the first bonding substrate 31 and then the second bonding substrate 32 can be contacted with the planar element, or first the second bonding substrate 32 and then the first bonding substrate 31 can be contacted with the planar element, it of course also being possible for both bonding substrates 31 and 32 to be brought into contact simultaneously with the planar element.

Starting out from a planar element having at least one pressure-sensitive or hotmelt adhesive layer within which heat can be generated, and having a discontinuously electrically conductive layer which represents at least one pole of the contacting electrodes, it is accordingly possible, therefore, for—for example—the planar element to be contacted first with the second bonding substrate (for instance the reverse of a vehicle mirror), and then either placed as a loose preassembly on to the first bonding substrate, or else to be joined first to the second bonding substrate, before being brought into contact with the first bonding substrate (a mirror mounting plate, for instance).

The at least partially loose preassembly obtained in this way, made up of the inventive planar element and the two bonding substrates, can then be assembled in different method steps to form the fixed assembly. For instance, passage of the adhesive through the cutouts in the contacting element, and bonding to the outside of the first bonding substrate, may be achieved by pressing the preassembly together for a certain time, using a heated die. After the die has been removed and the assembly cooled, the end product is obtained, comprising two bonding substrates joined to one another via a heatable planar element.

Instead of this, however, other methods can also be employed. Thus, for instance, a weight may be placed on the preassembly in order to accelerate the passage of the self-adhesive through the cutouts. Instead or in addition the preassembly may be housed for a defined time in a heated room (an oven chamber, for instance). Here, following removal and cooling of the assembly of substrate and planar element, and/or removal of the weight, the end product is obtained. Instead of a weight or a pressing die, a force may alternatively act on the preassembly in any desired other suitable way. Rather than introduction into a heated chamber, furthermore, the heat may also be generated by the planar element itself, as for example by application of an external electrical voltage to the contacting layer for a defined time. In this case the end product is likewise obtained after the end of the action of force and/or cooling of the assembly obtained.

Where a vehicle mirror is to be bonded, it can be advantageous first to place the planar element on a mirror mounting plate. In the resultant loose preassembly of mirror mounting plate and planar element, a mirror glass is placed on top of the planar element, and the resulting stack of mirror mounting plate, planar element and mirror glass is then bonded by the application to the assembly of a heated die, from the mirror glass side, for a certain time. Following removal of the die and cooling, the end product is obtained in the form of an assembly of mirror mounting plate, planar element and mirror glass.

The invention is described below by means of individual samples, selected exemplarily, without any desire to impose unnecessary restriction by virtue of the specific choice.

As examples of the implementation of the principle according to the invention, planar elements were produced with a pressure-sensitive adhesive or a hotmelt adhesive as the self-adhesive.

Sample 1 possessed the construction shown in FIG. 1, with the contacting element shown in FIG. 5, the self-adhesive here being an intrinsically heatable pressure-sensitive adhesive.

For the intrinsically heatable pressure-sensitive adhesive, first of all a base adhesive was produced along the lines of the disclosure in EP 04 712 016, with a comonomer composition of 44.5% by weight 2-ethylhexyl acrylate, 44.5% by weight n-butyl acrylate, 8% by weight methyl acrylate and 3% by weight of acrylic acid. Determination of the molecular weight gave an average molecular weight $M_w$ of 650 000 g/mol with a polydispersity $M_w/M_n$ of 7.0. The resulting base PSA was blended in solution with 40% by weight of graphite (Timcal Timrex KS 6) and then applied by means of a coating bar to a siliconized Glassine release paper (from Laufenberg). After drying at 120° C. for 10 minutes, the thickness of the resulting PSA layer was 100 μm.

Subsequently this PSA was crosslinked by means of electron bombardment. This electron bombardment took place with an instrument from Electron Crosslinking AB of Halmstad, Sweden. The coated PSA tape was passed over a chill roll, which is present as standard, beneath the Lenard window of the accelerator. In the bombardment zone, the atmospheric oxygen was displaced by flushing with pure nitrogen. The belt speed was 10 m/min. The electron beam dose here was 50 kGy, with an acceleration voltage of 180 kV for sample 1.

Applied to the crosslinked PSA layer obtained in this way, under gentle applied pressure, was the contacting element, which was cut from copper film having a thickness of 0.03 mm (see FIG. 5, with $x_1=3$ mm and $x_2=1.5$ mm). The heatable area had a size of 180 cm$^2$.

For sample 2, the construction shown in FIG. 1 was used, with an intrinsically heatable hotmelt adhesive as the self-adhesive and with a comb-shaped two-part copper foil contacting element.

For the intrinsically heatable hotmelt adhesive, the base adhesive used was an ethylene-vinyl acetate copolymer (EVA) of the Escorene Ultra FL 00728 (ExxonMobil) type, having a vinyl acetate content of 28% by weight. Compounded into this base hotmelt adhesive, using a Haake Rheomix recording extruder at a temperature of 140° C. and a rotary speed of 120 min$^{-1}$, was 14% by weight of conductive carbon black (Printex XE2; Degussa), over a period of 45 minutes. A planar element having a thickness of 200 μm was produced from the resulting polymer compound, using a vacuum press.

Applied to the resulting layer of pressure-sensitive adhesive was the contacting element, cut from copper foil with a thickness of 0.03 mm (see FIG. 5, with $x_1=3$ mm and $x_2=1.5$ mm). For this purpose, conductor tracks of the contacting element were sealed to the hotmelt adhesive at a temperature of 140° C. The heatable area had a size of 180 cm$^2$.

The planar elements obtained in this way were placed, with the side on which the contacting element is arranged, on to a plate made of acrylonitrile-butadiene-styrene plastic (ABS) as the first bonding substrate. Subsequently a glass sheet with a thickness of 2 mm was placed on to the loose preassembly thus obtained. Bonding to both bonding substrates took place in a single joining step, which was carried out under the action of heat and with pressure applied, for which a heated roller roll was used.

After bonding had taken place, each of the assemblies obtained in this way was investigated qualitatively for its bond strength. It was found that the bonding substrates were each joined firmly to one another. When an electrical voltage was applied to the external connections of the assembly, moreover, it was found that the adhesive assemblies obtained in this way had the desired heating functionality.

The exemplary experiments described above demonstrate the outstanding suitability of the flexible planar elements of the invention for obtaining a stable heatable adhesive bond.

The invention claimed is:

1. Planar element having an obverse and a reverse and comprising a heating layer and a contacting layer,
   the heating layer being composed of an intrinsically heatable self-adhesive which is designed as a conductor which heats up when an electric current is passed through, and
   the contacting layer being designed as an at least substantially two-dimensionally extended contacting element which is perforated by cutouts, and having a first side face and a second side face, the contacting layer via the first side face being in contact with the heating layer and being in electrically conducting communication therewith,
   wherein
   the second side face of the contacting layer forms the obverse of the planar element, and in that
   the cutouts in the contacting element are designed with passage through the thickness of the contacting element and are present in adhesive-free form at least in the region of the second side face.

2. Planar element according to claim 1, wherein the intrinsically heatable self-adhesive is a posistor.

3. Planar element according to claim 1, wherein the first side face of the contacting layer is embedded at least partly in the intrinsically heatable self-adhesive.

4. Planar element according to claim 1, wherein the first side face of the contacting layer bears at least substantially flatly on one side face of the intrinsically heatable self-adhesive.

5. Planar element according to claim 1, wherein the contacting element has a thickness of not more than 50 μm.

6. Planar element according to claim 1, wherein the cutouts make up at least 25% of the area of the first side face of the contacting layer.

7. Planar element according to claim 1, wherein the perforated contacting element has bridge-like regions.

8. Planar element according to claim 7, wherein the bridge-like regions have a width of not more than 5 mm.

9. Planar element according to claim 7, wherein the bridge-like regions of the perforated contacting element are present in a branched comb structure or finger structure.

10. Planar element according to claim 1, wherein the intrinsically heatable self-adhesive comprises at least one electrically conducting filler.

11. Planar element according to claim 10, wherein the electrically conducting filler is selected from the group consisting of graphite, carbon nanoparticles and carbon black.

12. Method of joining a planar element according to claim 1 to at least one bonding substrate, the method comprising the following steps:
    contacting the planar element with a bonding substrate in such a way that the second side face of the contacting layer touches a region of the surface of the bonding substrate and so forms a loose preassembly,
    passing the intrinsically heatable self-adhesive through the cutouts in the contacting element and at least partly filling them, and
    bonding the obverse of the planar element to the bonding substrate via the intrinsically heatable self-adhesive which has passed through the cutouts.

13. Method according to claim 12, wherein, for the passage of the intrinsically heatable self-adhesive through the cutouts in the contacting element, the preassembly composed of planar element and bonding substrate is pressed together.

14. Method according to claim 12, wherein, for the passage of the intrinsically heatable self-adhesive through the cutouts in the contacting element, the preassembly composed of planar element and bonding substrate is heated.

15. Method according to claim 14, wherein the preassembly is heated by passing an electric current through the intrinsically heatable self-adhesive.

16. Method of heating a bonding substrate, comprising providing the bonding substrate with a planar element according to claim 1 and heating the planar element.

17. Planar element having an obverse and a reverse and comprising a heating layer and a contacting layer,
    the heating layer being composed of an intrinsically heatable self-adhesive which is designed as a conductor which heats up when an electric current is passed through, and
    the contacting layer being designed as an at least substantially two-dimensionally extended contacting element which is perforated by cutouts, and having a first side face and a second side face, the contacting layer via the first side face being in contact with the heating layer and being in electrically conducting communication therewith,
    wherein
    the second side face of the contacting layer forms the obverse of the planar element, and in that
    the cutouts in the contacting element are only partially filled with adhesive.

* * * * *